US012754568B2

(12) United States Patent
Fisher

(10) Patent No.: US 12,754,568 B2
(45) Date of Patent: Oct. 6, 2026

(54) SYSTEM AND METHOD FOR TRANSPORTING CARGO AND CONTAINERS ACROSS A BODY OF WATER

(71) Applicant: Gerald Martin Fisher, Irvine, CA (US)

(72) Inventor: Gerald Martin Fisher, Irvine, CA (US)

( * ) Notice: Subject to any disclaimer, the term of this patent is extended or adjusted under 35 U.S.C. 154(b) by 95 days.

(21) Appl. No.: 18/843,598

(22) PCT Filed: Mar. 3, 2023

(86) PCT No.: PCT/US2023/014533
§ 371 (c)(1),
(2) Date: Sep. 3, 2024

(87) PCT Pub. No.: WO2023/168098
PCT Pub. Date: Sep. 7, 2023

(65) Prior Publication Data

US 2025/0199545 A1 Jun. 19, 2025

Related U.S. Application Data

(60) Provisional application No. 63/316,670, filed on Mar. 4, 2022.

(51) Int. Cl.
*G05D 1/667* (2024.01)
*B63B 25/00* (2006.01)
(Continued)

(52) U.S. Cl.
CPC ........... *G05D 1/667* (2024.01); *B63B 25/004* (2013.01); *B63B 35/28* (2013.01); *B63B 35/40* (2013.01);
(Continued)

(58) Field of Classification Search
CPC ........ G05D 1/667; G05D 1/6445; G05D 1/69; G05D 2105/28; G05D 2109/34;
(Continued)

(56) References Cited

U.S. PATENT DOCUMENTS 3,823,681 A * 7/1974 Cushing ................ B63B 25/006 114/260
3,934,530 A * 1/1976 Kossa ................... B63B 25/006 114/260
(Continued)

FOREIGN PATENT DOCUMENTS

CN 105775054 A * 7/2016 ........... E02B 15/046
EP 2643208 B1 * 2/2015 ............. B63B 35/42
(Continued)

*Primary Examiner* — Hunter B Lonsberry
*Assistant Examiner* — Harrison Heflin
(74) *Attorney, Agent, or Firm* — Robert Cantrell; Jose Jimenez; JIMENEZ LAW FIRM

(57) ABSTRACT

A system and method for transporting cargo and containers across a body of water having at least one mothership vessel designed to carry at least one deployable and retrievable vessels within a hull portion of the at least one mothership vessel. The mothership vessel is designed to partially submerge its hull to flood its well deck wherein the plurality of deployable and retrievable vessels may be deployed or retrieved, the deployable and retrievable vessels allowed to float when the well-deck of the mothership vessel is flooded. At least one mathematical model is used to find a solution for given routes along one or more legs between ports, the mothership vessel, and the deployable and releasable vessels, the route substantially to manage supply chain optimization of the cargo carried on the mothership vessel and the costs and pace of travel. Machine learning may aid in calculations.

15 Claims, 15 Drawing Sheets

(51) Int. Cl.

| | |
|---|---|
| ***B63B 35/28*** | (2006.01) |
| ***B63B 35/40*** | (2006.01) |
| ***B63B 79/20*** | (2020.01) |
| ***B63B 79/40*** | (2020.01) |
| ***G05D 1/644*** | (2024.01) |
| ***G05D 1/69*** | (2024.01) |
| ***G05D 105/28*** | (2024.01) |
| ***G05D 109/30*** | (2024.01) |

(52) U.S. Cl.
CPC .............. *B63B 79/20* (2020.01); *B63B 79/40* (2020.01); *G05D 1/6445* (2024.01); *G05D 1/69* (2024.01); *G05D 2105/28* (2024.01); *G05D 2109/34* (2024.01)

(58) Field of Classification Search
CPC ....... B63B 25/004; B63B 35/28; B63B 35/40; B63B 79/20; B63B 79/40
See application file for complete search history.

(56) References Cited

U.S. PATENT DOCUMENTS

| | | | | |
|---|---|---|---|---|
| 9,928,474 | B1 * | 3/2018 | Evans | G06Q 10/083 |
| 2002/0078873 | A1 * | 6/2002 | Fisher | B63B 3/08 114/260 |
| 2008/0213067 | A1 * | 9/2008 | Jegers | B65G 63/004 414/803 |

FOREIGN PATENT DOCUMENTS

| | | | | | |
|---|---|---|---|---|---|
| KR | 20120067357 | A * | 6/2012 | B63B 35/44 |
| WO | WO-2015018822 | A1 * | 2/2015 | B63B 25/006 |
| WO | WO-2018157034 | A1 * | 8/2018 | B63B 35/42 |

* cited by examiner

SYSTEM AND METHOD FOR TRANSPORTING CARGO AND CONTAINERS ACROSS A BODY OF WATER

FIELD OF THE INVENTION

The inventive concept relates generally to a system and method for transporting cargo and containers across a body of water using an algorithm, a mothership vessel, and a plurality of deployable and retrievable vessels designed to be carried by the mothership vessel within a door-to-door supply chain.

BACKGROUND

Major ports worldwide can be congested with container ships as container ships await an opportunity to offload cargo and containers. The congestion problem can have a global scope. Most non-bulk goods are transported by sea in ocean shipping containers of 20 to 53 feet long, with 40 feet being the most common length. Loading and unloading ships designed to carry these ocean shipping containers can only be performed at ports and terminals with deep draft and land space and large equipment designed for the purpose. The ocean shipping containers awaiting offloading can exceed the capacity of ports and terminals to offload the containers, creating congestion and a slower supply chain velocity than otherwise possible, which in turn can mean incurring added expenses for stakeholders in a supply chain including, but not limited to, manufacturers, cargo and container owners, logistics operators, and consumers. The congestion may cause inflationary pressures as supplies become difficult and expensive to obtain because they are trapped in the congestion.

Contributing to congestion are ships designed to carry containers in the quantity of as many as 24,000 Twenty-foot Equivalent Units (TEUs), the volume designed to provide owners and operators an opportunity to deliver cargo and containers at the lowest possible cost. Few ports in the United States, at the time of this disclosure, can handle these container ships. Such container ships draft nearly 50 feet of water below the surface and tower hundreds of feet above the surface and, therefore, require infrastructure to handle the dimensions of such ships, land space large enough to handle the offloaded cargo and containers, and labor and machinery to handle the cargo and containers through the given port system. Therefore, a bottleneck may arise at such ports as the flow of cargo and containers awaiting offloading exceeds the capacity of the port system to move offloaded cargo and containers out of the port system and onto inland carriage by rail or truck to their final destinations. Because of the size of the ships currently in use and the congestion at the few terminals at which they are able to discharge or load ocean shipping containers with or without cargo, the terminal congestion causes road and rail congestion when those containers leave the terminals.

The water depth, overhead clearance, berth size, and geographical requirements for landside operations of ships carrying more than 12,000 TEUs is available, at the time of this disclosure, in about 5 terminals in four US ports; while Europe and Asia have similar limitations. Future terminals contemplated for ships carrying more than 12,000 TEUs may also cause significant environmental problems because of dredging required to deepen the ports and the need to provide electrical power to operate the cranes and equipment that move the containers within the terminals.

Regarding land and that the terminals may lack enough land adjacent to the edge of the water to handle incoming cargo and containers from ships capable of carrying more than about 12,000 TEUs, terminals may also be substantially constrained from expansion, with the ocean and occupied land preventing further growth of port facilities. Cities and communities developed around ports impede opportunities to build more and larger terminals. Even if land can be acquired, the cost of building, modifying, and dredging to expand existing terminals and building new terminals in new locations away from cities may be cost prohibitive and inflationary because those costs are likely affordable only by government financial resources. The time it takes to build new terminals can take many years. Terminals can also create pollution, highway congestion, and lost productivity for communities adjacent to the facilities.

Ships over 12,000 TEUs may offload so many containers for a given geographical space that containers may be stacked as high as eight containers tall. Such stacking, and the congestion within the terminal itself, can result in misplaced containers, confusion, and detention charges for the owners of the cargo and containers. Also, when a consignee seeks its container, the containers in the stacks must be sorted to give access to the container sought for retrieval. Each movement of a container within the terminal results in a loading and offloading charges of hundreds of dollars, which must be added to the detention charges imposed by the port.

Inefficiencies may also extend far out to sea. Ships capable of carrying more than 12,000 TEUs may travel at slower sea-speeds than would otherwise be commercially optimal. There are few reasons, otherwise, for a ship to burn the fuel needed to travel faster if the ship will sit for a time upon arrival while waiting to be given a berth to discharge cargo and containers.

Ships over about 12,000 TEUs exist and are utilized in their current supersized form, at the time of this disclosure, because as of this disclosure, the 10 largest ocean carrier enterprises, which carry approximately 85% of the world's containerized cargo, operate in trusts to share space to obtain their cost economies but control pricing. Therefore, as of this disclosure, the consolidation of control has resulted in pricing for the transportation of cargo for shippers of cargo on those supersized ships of more than 15 times that of prior years while resulting in the observed congestion that will take years to resolve without a different method of transportation. As of this disclosure, these transportation costs have been found to be both prohibitive to the shippers and owners of containerized cargo and inflationary by recognized government sources. As of this disclosure, because the supersized ships are the primary means of ocean transportation of containerized cargo, this problem is likely to remain for years if the only solution is to build more terminals to accommodate the supersize containerships capable of carrying more than 12,000 TEUs.

The importance of addressing the drawbacks of ships able to carry more than 12,000 TEUs could further serve as a catalyst to allow a next stage of improved supply chain efficiency beyond that pioneered by Walmart and its development of the large store format in the 1980s. Walmart became a leader in best practice retail logistics. Many other enterprises modeled its format, and Amazon introduced a model of distribution built around enlarged distribution centers able to hold the quantity and variety of goods for many customers, the distribution centers servicing multiple states. Economies of scale created enhanced productivity at Walmart, Amazon, and companies that borrowed from their models, including introducing efficiencies in maritime logistics.

However, as of this disclosure, maritime logistics has evidenced itself in bottlenecks, having reached near peak efficiency in the benefits that ships carrying over about 12,000 TEUs can provide given the described limitations of the port systems.

Although the possibility exists to offload cargo and containers from the supersize ships onto small feeder ships when near ports, but such transfers can be an involved and complex exercise complicated by waves and weather because even near-offshore waters lack the protective landmass of a port or harbor. Therefore, there is a need in the market for an improved system to carry cargo and containers across bodies of water to eliminate shipping bottlenecks. Also, at the time of this disclosure, nearly one hundred smaller ports and terminals exist on the coasts and rivers of the United States and, similarly, in other nations which underutilized yet have equipment, space, rail, and road connections suitable for smaller vessels below 12,000 TEUs.

SUMMARY OF THE INVENTION

Shipping logistics is the maritime component of a supply chain involving coordinated and sometimes complex operations to move products, raw materials in ocean shipping containers of from 20' to 53' TEU equivalents from a point of origin to a destination. Disclosed herein is a system and method for transporting cargo and containers across a body of water as a system of supply chain logistics, the system and method having at least one mothership vessel designed to carry an at least one deployable and retrievable vessel within a hull portion of the at least one mothership vessel. The mothership vessel is designed to partially submerge a hull portion of the mothership vessel wherein the at least one deployable and retrievable vessels may be deployed from at least one or more of the front (bow), side, and back (stern) of the mothership vessel, the deployable and retrievable vessels allowed to float when the hull portion of the mothership vessel is in the partially submerged state. As such, the system and method for transporting cargo and containers across a body of water allows the disclosed system for transporting cargo across a body of water to have different parameters at different times, namely, to be a large container vessel when crossing a body of water from one port system to another port system and at least one smaller container carrying vessel when at or in proximity to the given port or terminal systems. The terms ship and vessel in this disclosure are synonymous and may also include deployable vessels considered by shape and size to fit the dictionary definition of a barge.

The system and method for transporting cargo and containers across a body of water is further enabled by at least one algorithm that finds a solution for a given route of cargo to be containerized and optimize both the speed and cost of travel from origin to ultimate destination while meeting delivery and requirement schedules of the owner/shipper rather than that of the supersized ship. The algorithm may include modifiers that could affect the solution, may adjust direction calculations as effects are realized and uncertainties are understood, and may simulate travel under the calculated solution before undertaking travel utilizing many potential mathematical models. Machine learning may aid in assessing situations and past performances, making decisions, acting on decisions, and creating improved mathematical models from which to make at least one or more route and loading calculations.

The system and method for transporting cargo and containers across a body of water may be integrated with supply chains, namely the network of people and organizations involved in upstream and downstream linkages, with processes and activities to move cargo and containers from points of origin to final destinations. As such, at least one computer processor is operable within the system and method for transporting cargo and containers across a body of water, the at least one computer processor having at least one memory storage medium. A logistics manager program is operationally disposed on the at least one computer processor with the at least one memory storage medium, the logistics manager program designed to calculate a route and pace of travel to optimize the cost and routing of cargo in containers from at least one port facility to the mothership vessel traversed by at least one of the at least one deployable and retrievable vessels, at least one leg wherein the mothership vessel traverses a body of water while carrying at least one of the deployable and retrievable vessels, and at least one leg traversed by at least one of the at least one deployable and retrievable vessels from the mothership vessel toward at least one port facility and through the required road and rail routing to final destinations. Operations are improved by optimizing route selection and timing with elements immediately impacting a given vessel and may be coordinated with a given supply chain network through which cargo and containers originate and will be received.

Optimize, optimal, and optimization in this disclosure mean to make a solution as good as possible where good is the variable the inventive concept seeks to improve, for example, transporting cargo and containers at the lowest possible cost and fastest supply chain velocity via the system and method for transporting cargo and containers across a body of water and its inland transit. Supply chain velocity is substantially the speed by which an activity within the supply chain is executed.

Optimal may, in fact, be the lowest possible cost and fastest supply chain routing considering all other modifiers such as weather conditions, expected shipping traffic, and delivery schedules. The optimal speed of a vessel, for another example, may be a balance between the fastest speed a vessel can travel and a slower speed that may save fuel costs, a higher fuel cost of traveling faster reflected in the increased resistance of water as the vessel moves faster. The optimal speed may, therefore, be a speed slower than the top speed whereby the vessel travels fast enough to meet supply chain schedules without incurring the higher fuel costs required to travel at its faster speed. Optimize, therefore, may be the top performance possible and may be a goldilocks zone of neither too much nor too little from which to achieve a best-fit result.

Mathematically, optimal may be a peak or trough on a curve graphically representing results derived from a route optimization formula but may also be end points within a range and domain of values or another point on the curve as a situation warrants as applied to the various supply chain needs of the owners and shippers of the cargo carried in the containers on board.

The logistics manager program is further designed to apply at least one or more spatial, temporal, material, financial, environmental, and risk modifiers, the modifier values used to optimize at least the cost of transporting cargo and containers along each leg, the modifiers constraining an at least one operational parameter for given vessels. The logistics manager program updates the selected route and pace of travel incrementally and in response to voluntary and involuntary changes in at least one or more of the speed and direction of travel. As such, the logistics manager program affords users the opportunity, with the mothership vessel and at least one deployable and retrievable vessel, to improve the speed, reliability, financial cost of carriage, service scheduling, and more. Such can be achieved because the mothership vessel and deployable and retrievable vessels can be together at times and apart at other times, the feature of being apart adding such possibilities as delivering to multiple ports and terminals at substantially the same time.

One embodiment of the system for transporting cargo and containers across a body of water further includes at least one machine learning program designed to optimize at least the cost of transporting the cargo and containers and accelerate the supply chain velocity, the machine learning program further is designed to apply the selected modifiers. Machine learning may also improve upon the algorithm used by the logistics manager program, for example, by changing how modifiers are applied or weighted to improve results.

One embodiment of the system for transporting cargo and containers across a body of water may further include at least one inland transportation system, the logistics manager program at least one or more of designed to select a route of at least one inland leg and to functionally interface with at least one land-based logistics manager program. A logistics manager program may include both algorithms for making calculations and data management for acquiring, storing, and applying data. The inland route includes at least one or more of road, rail, and river movement.

One embodiment of the system for transporting cargo and containers across a body of water further includes an interface to at least one simulation program. A simulation program allows route optimization to be tested in a simulator before being applied to actual vessels. Load optimization may also be simulated.

One embodiment of the system for transporting cargo and containers across a body of water further includes at least one or more of the mothership vessel and the at least one deployable and retrievable vessels wherein one or more vessels may operate at least partially autonomously, the logistics manager program interfaced with at least one autonomous maritime navigation system and associated sensors, the at least one autonomous maritime navigation system designed to at least partially autonomously control at least one or more mothership vessels and deployable and retrievable vessels.

The system for transporting cargo and containers across a body of water may be operationally coupled to a maritime navigation system, the maritime navigation system designed to at least one or more of autonomously, partially autonomously, and manually assess an area of travel, decide on actions, take actions, and assess results, assessments and decisions performed incrementally and in response to selected events, the maritime navigation system designed to follow the selected route and pace selected by the logistics manager program and personnel using the logistics manager program.

Cost may be calculated considering hard values such as a given unit of currency and softer values that may be estimated at least partially subjectively or may depend on probabilities. Costs may be assessed considering the value of at least one or more, but not limited to, time, money, space, material, energy, information, function, security, personnel, and customer requirements and satisfaction. In one embodiment, costs and cargo owner or shipper customer requirements are primarily considered in terms of moving at least one container through the system of road and rail transport and transporting that cargo and containers across a body of water. In this embodiment, how costs and customer requirements are calculated may be modified by other considerations, for example, bearing more costs in one area, such as security, to minimize other risks, such as piracy to the supply chain direction and velocity requirements of the customer.

"Heavy lift" is a term known in the shipping industry in which ships take on ballast to partially submerge and deballast to lift themselves and whatever they are carrying from their depth in the water. Heavy lifting may be used to carry physical items such as drilling rigs, hulls, and project cargo and vessels carrying containers. The inventive concept applies "heavy-lift" as a mothership vessel that can carry deployable and retrievable vessels, the deployable and retrievable vessels capable of independent operation on the open sea either self-propelled or non-self-propelled. This carrying capability is a form of nesting, meaning putting one object inside another and reducing the profile of the combined whole for at least a period of its operation.

Cargo and containers include situations where there are both cargo carried in 20-53 foot containers and empty containers, and can also include situations where there is one or another cargo, for example, bulk materials such as minerals and agricultural, vehicles, or even other vessels that might be a cargo with no containers.

In another embodiment of the inventive concept, the mothership vessel may carry one or more retrievable and deployable vessels wherein the retrievable and deployable vessels are designed for other uses beside carrying cargo and containers. One representative embodiment of another use is for military logistics and operationally may include, but is not be limited to, retrievable and deployable vessels designed to and equipped for hospital and medical services, personnel accommodations, vessel repairs, aircraft repairs, providing electrical power, providing desalinization, and delivery ashore by modules equipped to carry provisions, equipment, weapons, and anything required for military logistics and action by use of shore ramps and anchoring devices.

In another embodiment of the inventive concept, the mothership vessel may be utilized without retrievable and deployable vessels to carry large and heavy objects such as other ships, ship construction parts, and mobile port construction modules because of the mothership vessel's design to take on ballast to flood its well-deck inside the hull and deballast to lift heavy and large objects. For military purposes, these would include but are not limited to damaged or undamaged vessels including but limited to a fleet of littoral combat or patrol type vessels, multiple destroyers to and including an aircraft carrier which may fit on the well-deck and inside the hull and wing-walls of the mothership. In other embodiments, the large objects may, themselves, become operational platforms such as forming an expedient platform for helicopters and jump jets.

In another embodiment of the inventive concept, the mothership vessel may carry and transport one or more humanitarian relief modules which may be located at designated stations around the world to be floated on to the mothership vessel and transported by the mothership as needed, or if self-propelled, travel without the mothership vessel as needed. Humanitarian relief modules may include, but are not limited to, power generation, desalinization, accommodation, and hospital and medical services deliverable to a needed location, vehicle transport, aircraft repair, food and subsistence transport, temporary housing, and other configurations needed for emergency humanitarian purposes.

The inventive concept now will be described more fully hereinafter with reference to the accompanying drawings, which are intended to be read in conjunction with both this summary, the detailed description, and any preferred and/or particular embodiments specifically discussed or otherwise disclosed. This inventive concept may, however, be embodied in many different forms and should not be construed as limited to the embodiments set forth herein; rather, these embodiments are provided by way of illustration only and so that this disclosure will be thorough, complete, and will fully convey the full scope of the inventive concept to those skilled in the art.

DETAILED DESCRIPTION OF THE INVENTION

Following are more detailed descriptions of various related concepts related to, and embodiments of, methods and apparatus according to the present disclosure. It should be appreciated that various aspects of the subject matter introduced above and discussed in greater detail below may be implemented in any of numerous ways, as the subject matter is not limited to any particular manner of implementation. Examples of specific implementations and applications are provided primarily for illustrative purposes.

Figure 1A:
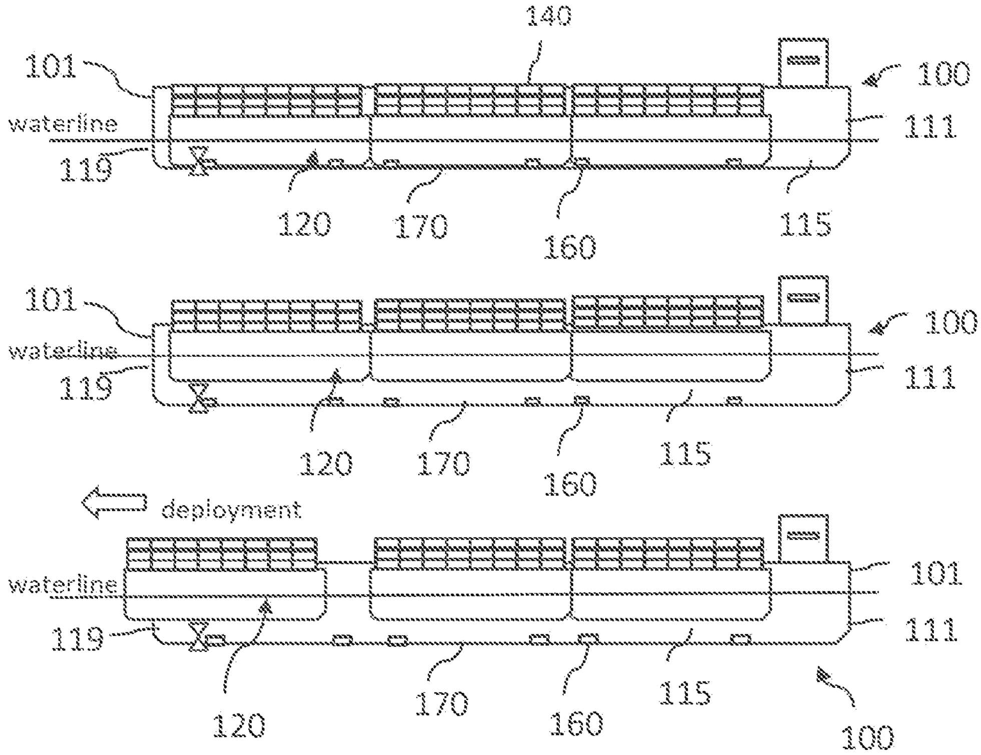
FIG. 1A illustrates a representative deployment of a deployable and retrievable vessel from inside the hull of a mothership vessel in a side perspective.
Figure 1B:
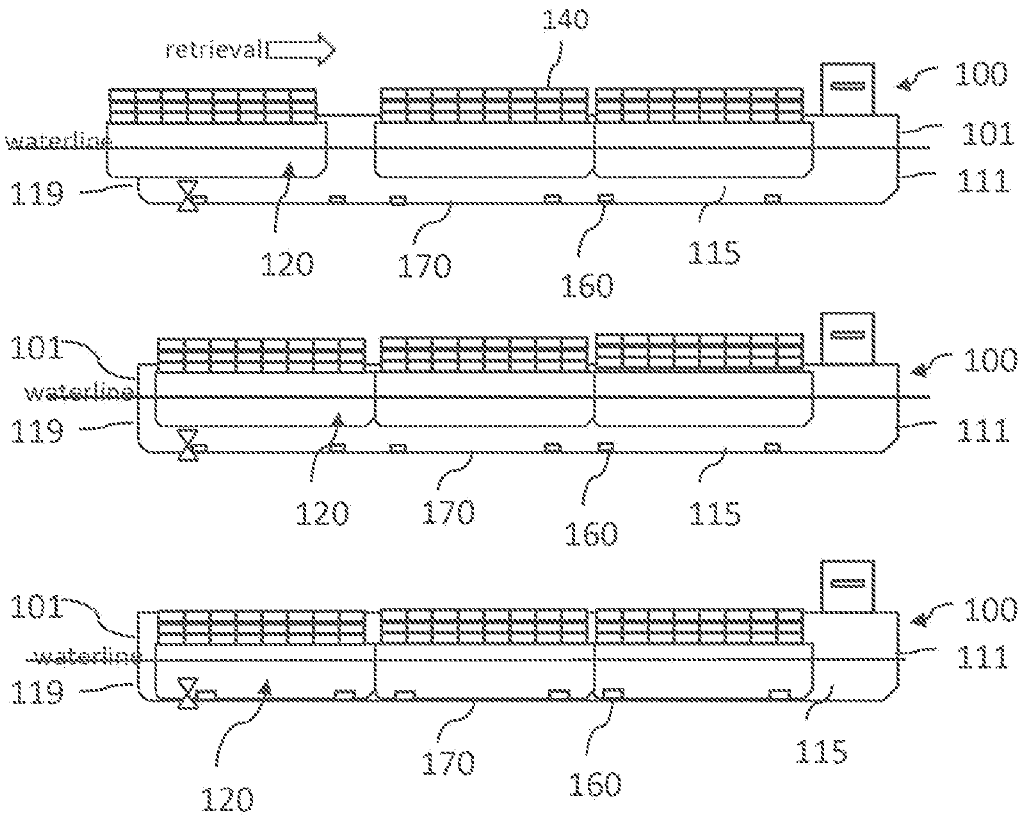
FIG. 1B illustrates a retrieval of a deployable and retrievable vessel from inside the mothership vessel in a side perspective.
Figure 2A:
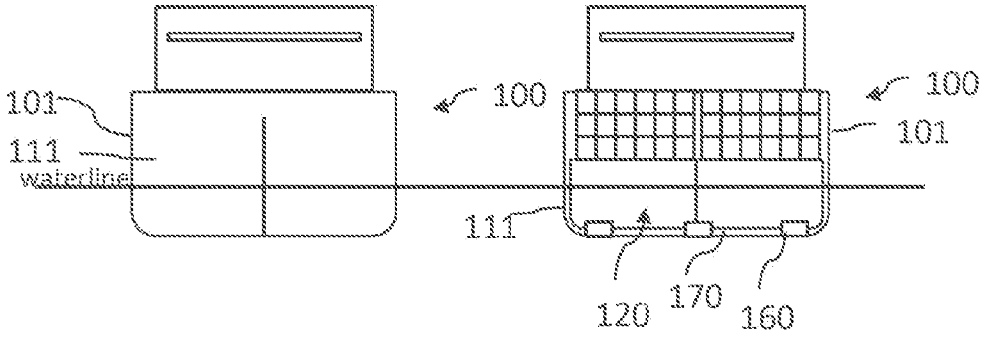
FIGS. 2A to 2B illustrates front and back views of the mothership vessel and deployable and retrievable vessels that ride inside the mothership vessel.
Figure 2B:
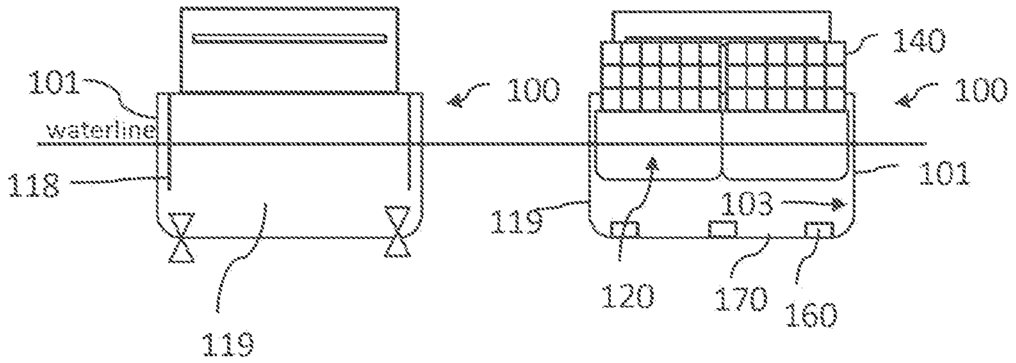
Figure 3:
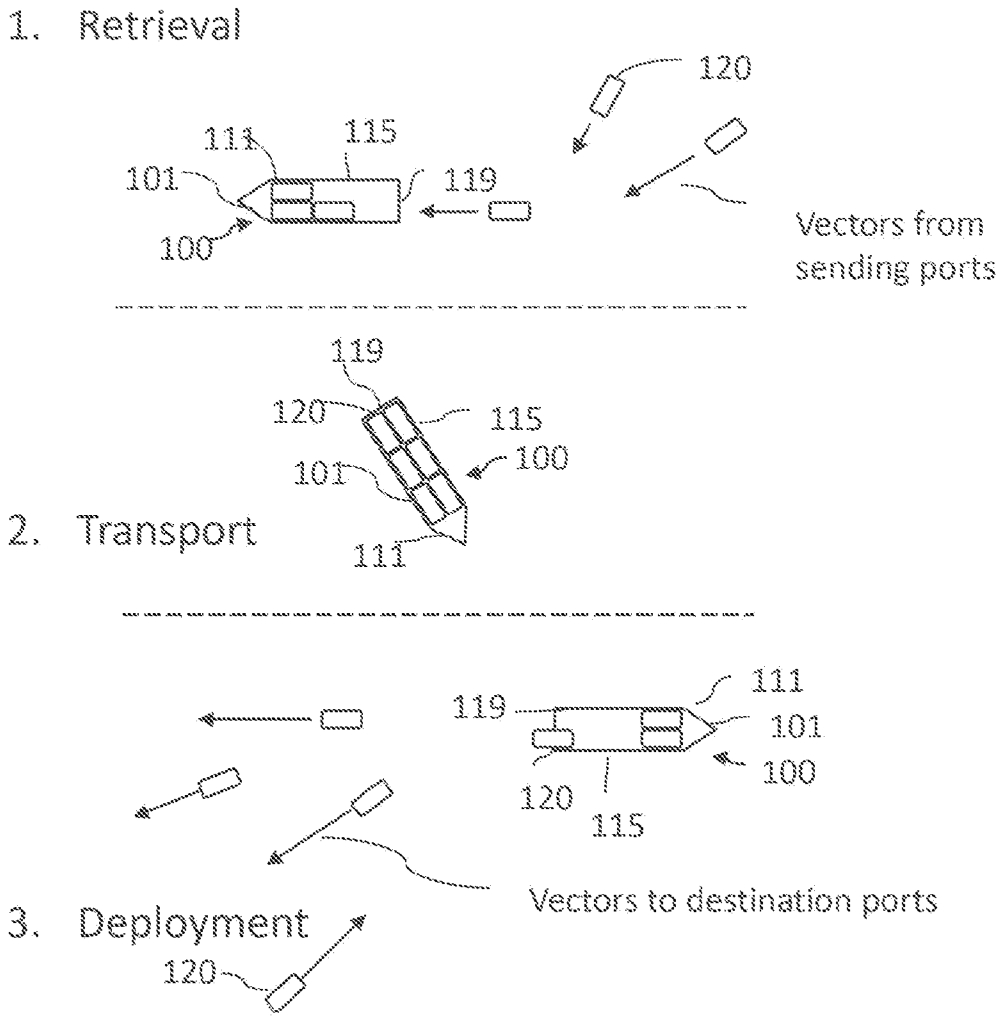
FIG. 3 illustrates a representative top view of a retrieval, transport, and deployment cycle of the mothership vessel and deployable and retrievable vessels.

FIGS. 1-3 illustrate one representative embodiment of the system and method of transporting multiple cargos and containers across a body of water wherein users of the system and method receive the benefit of the supersized container ships capable of carrying more than 12,000 TEUs across stretches of ocean and smaller container ships of less than 12,000 TEUs capable of navigating ports and riverways inaccessible to the supersized ships carrying more than 12,000 TEUs. In this embodiment of the inventive concept, a mothership vessel 100 carries within its hull 101 at least one smaller deployable and retrievable vessel 120 capable of being at least one or more of operated under its own power, towed, and pushed—the power source, in one embodiment, which may be modular and temporary, such as an attachment to power releasable and retrievable vessels 120 through the Panama Canal, Suez Canal, or other canal system such as the Great Lakes system in the US Midwest.

One embodiment of the system for transporting cargo and containers across a body of water has the at least one mothership vessel 100 designed to carry the at least one deployable and retrievable vessels 120 nested and resting within the hull portion of the at least one mothership vessel 101. The mothership vessel 100 is designed to partially submerge the hull portion of the mothership vessel to flood its well-deck 170 wherein the at least one deployable and retrievable vessels 120 may be deployed or released from at least one or more of the bow of the mothership vessel 111, side of the mothership vessel 115, and bow of the mothership vessel 119, the at least one deployable and retrievable vessels 120 allowed to float when the hull portion of the mothership vessel 101 is in the partially submerged state.

The illustrated embodiment uses the well deck 170 and internal walls of the submersible hull portion of the mothership vessel 101 where the submersible hull system 101 is substantially an open space and openable to the ocean via at least one or more door members 118 on at least one or more of the bow 111, stern 119, and sides 115. In one embodiments of the inventive concept, the at least one or more door members 118 are substantially permanently open and are substantially above the waterline when the hull of the mothership vessel 101 is in an unsubmerged state. The deployable and retrievable vessels 120 occupy the internal well-deck 101 open space via the principle of putting one object inside another (nesting), a plurality of deployable and retrievable vessels 120 which may be secured within the open space wherein the mothership vessel 100 operates as a container ship able to carry more than 12,000 TEUs. A locking system 160 may be deployed to keep the deployable and retrievable vessels 120 substantially affixed to each other and the mothership vessel 100 to prevent independent movement from each other and the mothership vessel 100 while loaded aboard the mothership vessel 100.

In one embodiment of the inventive concept, the deployable and retrievable vessels 120 are released by at least partially submerging an at least one well-deck platform of the mothership vessel 170 wherein the deployable and retrievable vessels 120 are disposed to be released and to float independently from the mothership vessel 100 and to be retrieved by reversing the process wherein the deployable and retrievable vessels 120 are secured to the at least one well-deck platform 170. One of ordinary skill in the art would recognize that the mothership vessel 100 uses ballasting to add or remove water within the hull of the mothership vessel 101 to reduce the buoyancy of the mothership vessel 100 and would add air and, therefore, pump out water to increase the buoyancy of the mothership vessel 100.

Figure 4:
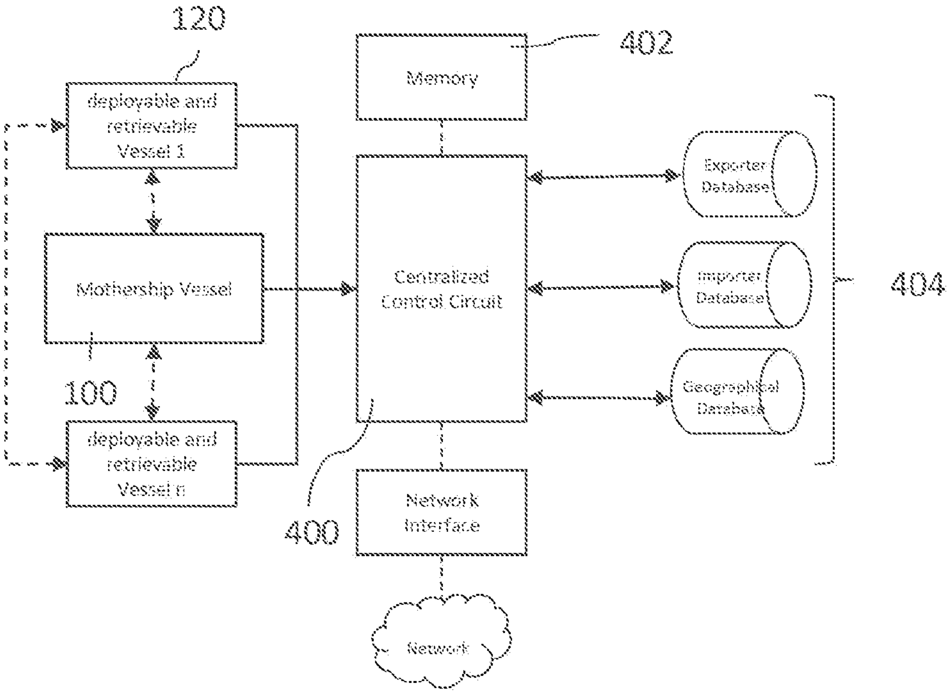
FIG. 4 illustrates a representative computer system interfaced with data, the mothership vessel, and the deployable and retrievable vessels.
Figure 8:
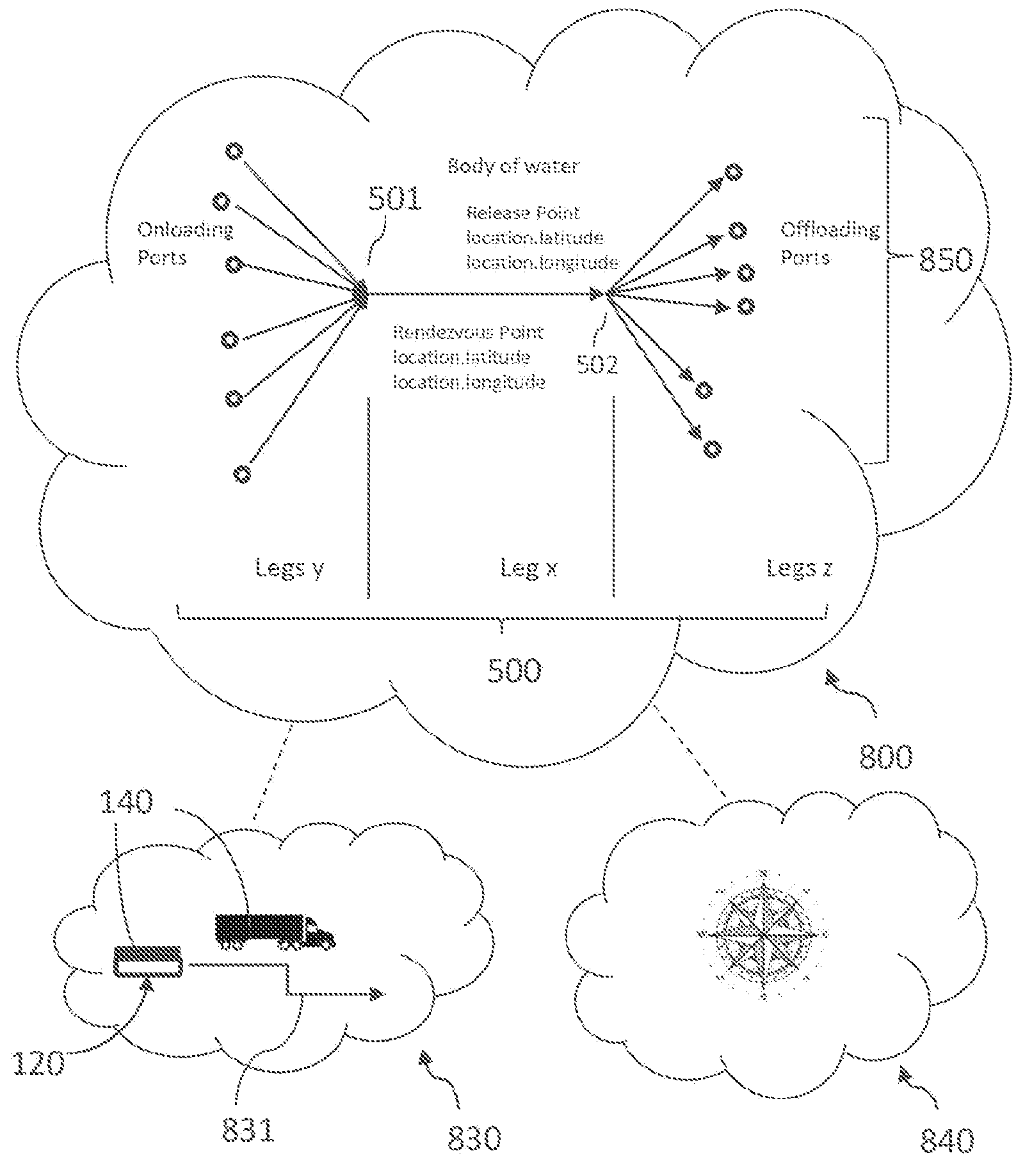
FIG. 8 illustrates representative route legs.

FIG. 4 illustrates that at least one computer processor 400 is operable within the system for transporting cargo and containers across a body of water, the at least one computer processor 400 having at least one memory storage medium 402. A logistics manager program 800, as illustrated in FIG. 8, is operationally disposed on the at least one computer processor 400 with the at least one memory storage medium 402 and at least one database 404, the logistics manager program 800 is designed to calculate a route and pace of travel and the safety and operational needs of the mothership vessel 100 and the deployable and retrievable vessels 120 nesting inside to optimize at least the cost and supply chain needs of its customers in transporting cargo and containers along at least one leg from at least one port facility to the mothership vessel 100 traversed by at least one of the at least one deployable and retrievable vessels 120, at least one leg wherein the mothership vessel 100 traverses a body of water while carrying at least one deployable and retrievable vessel 120, and at least one leg from the mothership vessel 100 to at least one port facility.

Optimize may be viewed from either or both the operation of a single mothership vessel 100 and at least one deployable and retrievable vessel 120 and aggregates of mothership vessels 100 and deployable and retrievable vessels 120, wherein a given deployable and retrievable vessel 120 may deploy from one mothership vessel 100 and return to a different mothership vessel 100 as a part of optimizing the transportation of cargo and containers 140 through the system for transporting cargo and containers across a body of water and inland transport by truck or rail. The optimal speed of a ship, for example, may be a balance between the fastest speed a ship can travel modified by the increased resistance of water created as the ship moves faster. The ship, therefore, will travel slower than it could go at full speed, so the ship travels fast-enough without incurring the higher fuel costs required to travel at full speed. Optimal may balance such modifiers as risk, for example, the presence of other ships or other navigation hazards where the optimal speed to navigate may be less than the top speed a ship can go but is still fast enough to meet travel schedules. Mathematically, optimal may be a peak or trough in a curve from the graphically presented results of a route optimization formula calculation and cargo supply chain velocity but may also be end points within a range and domain of values or another point on the curve as a situation warrants. Calculations may further involve a plurality of mothership vessels 100 and deployable and retrievable vessels 120 moving between mothership vessels 100 instead of being assigned to one mothership vessel 100.

Figure 5:
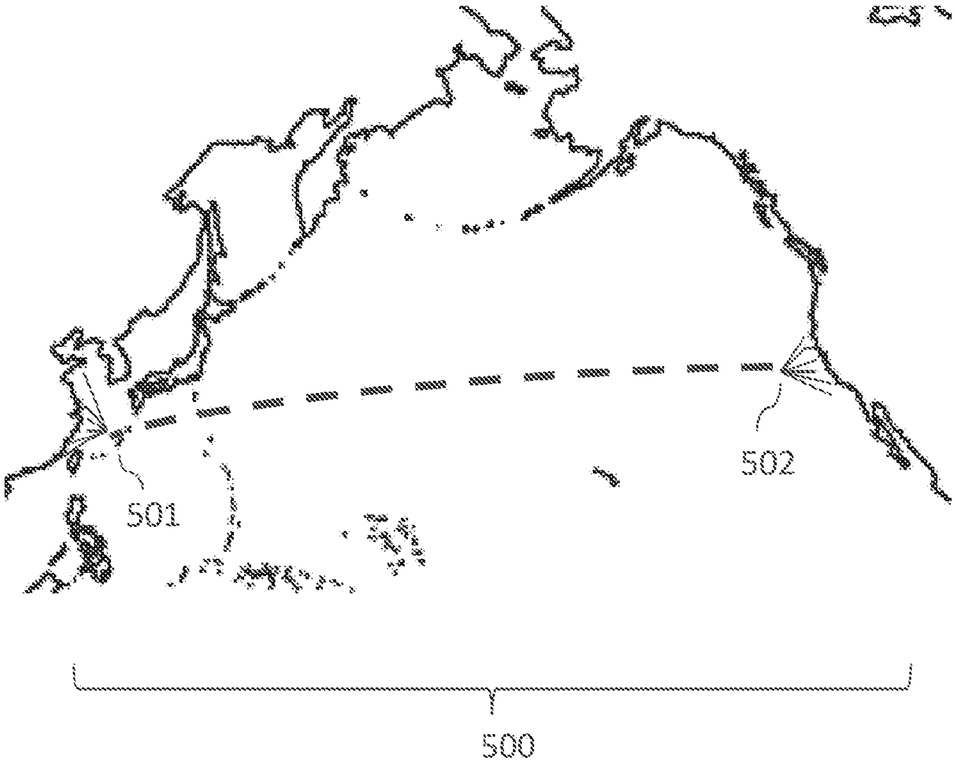
FIG. 5 illustrates a representative route over a body of water.

FIG. 5 illustrates a rendezvous point 501 and a release point 502 on a representative route of travel 500, the illustrated route 500 spanning, for example, the Pacific Ocean. Optimal travel for the disclosed mothership vessel 100 may include the route of travel 500 having more than one rendezvous point 501 or release point 502.

Figure 6:
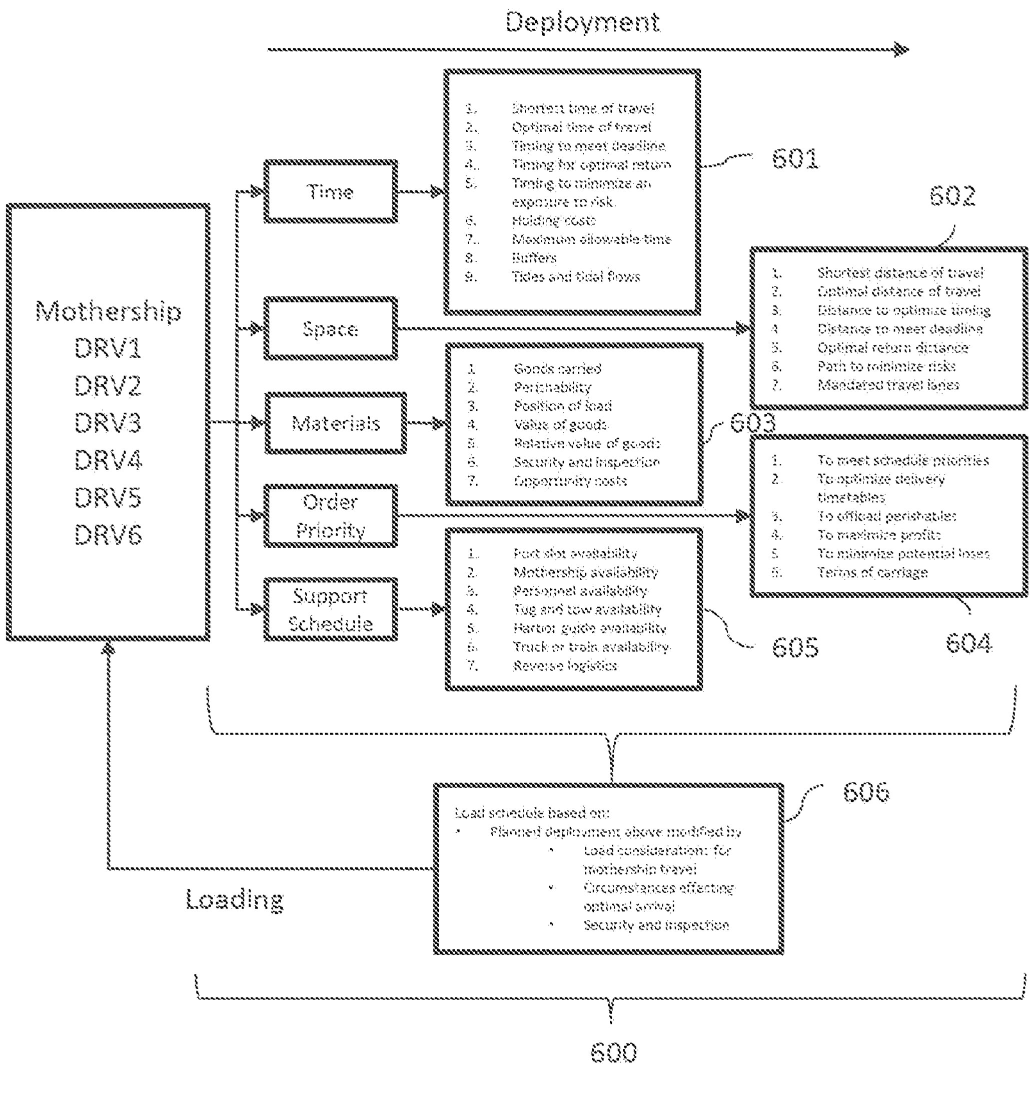
FIG. 6 illustrates modifiers that can modify route optimization calculations.

FIG. 6 illustrates that in one embodiment of the inventive concept, multiple vectors may be assessed from a single release point 502 to optimize the collective time and distance the deployable and retrievable vessels 120 are required to travel to their respective port destinations. The rendezvous points 501 and release points 502 may be designated by a latitude and a longitude but may use other location-defining coordinates. Other variables may be included in the calculations as relevant to give weight to other considerations such as 1) type of cargo and containers 140, 2) timing when one delivery is required over others, 3) timing of traffic considerations at given ports, 4) ocean currents and weather as they may affect movement, and 5) sources of fueling, which may be performed at any interval during system and method operations, movement that may be conducted by the mothership vessel 100 in intervals between releasing deployable and retrievable vessels 120 and other supply chain velocity requirements of its customers.

FIG. 6 further illustrates that the logistics manager program 800 is further designed to apply at least one or more spatial, temporal, material, financial, environmental, operational and risk modifiers 600 to optimize at least the cost of transporting cargo and containers 140 along each leg and supply chain velocity requirements, the modifiers constraining an at least one operational parameter for given vessels 100, 120. The logistics manager program 800 updates the selected route and pace of travel incrementally and in response to voluntary and involuntary changes in at least one or more of the speed and direction of travel. Risk, in this illustration, can include, but is not limited to, at least one or more of traffic risks, commercial risks, weather-based risks, environmental risks, timing risks, geopolitical risks, risks of pirating, geographic risks, and any supply chain velocity risks.

One embodiment of the inventive concept modifies the selected route and pace of travel based on time 601, including at least one or more of the shortest time of travel, optimal time of travel, timing to meet deadlines, timing for optimal returns, timing to minimize exposure to risk, timing related to tides and tidal flows and timing for supply chain velocity purposes.

One embodiment of the inventive concept modifies the selected route and pace of travel based on distance 602, distance including at least one or more of the shortest distance of travel, optimal distance of travel in aggregate with other vessels, distance to optimize timing, distance to meet a deadline, optimal return distance, path to minimize risks, mandated travel lanes, and supply chain velocity requirements.

One embodiment of the inventive concept modifies the selected route and pace of travel based on materials 603, materials including at least one or more of cargo and containers 140 carried, perishability, position of load, value of goods, relative value of goods, security and inspection needs and supply chain velocity requirements.

One embodiment of the inventive concept modifies the selected route and pace of travel based on order priority 604, order priority including at least one or more of meeting schedule priorities, optimizing delivery timetables, offloading perishables, maximizing profits, and minimizing potential losses while maintaining supply chain velocity requirements.

One embodiment of the inventive concept modifies the selected route and pace of travel based on the support schedule 605, the support schedule including at least one or more of port slot availability, mothership vessel availability, personnel availability, tug and tow availability, harbor guide availability, truck or train availability, refueling schedules, the condition of the ship, and matters of general convenience and supply chain velocity requirements.

Modifiers may include, but are not limited to:

I. Time 601
  1. Finding the shortest time of travel
  2. Finding the optimal time of travel
  3. Meeting a deadline
  4. Timing optimal returns
  5. Timing to minimize an exposure to risk
  6. Timing to minimize holding costs
  7. Maximum allowable time
  8. Buffers
  9. Timing with schedule of tides and tidal flows
  10. Supply chain velocity requirements II. Space 602
  1. Finding the shortest distance of travel
  2. Finding the optimal distance of travel
  3. Establishing distance to optimize timing
  4. Establishing distance to meet a deadline
  5. Establishing optimal return distance 6. Finding a path to minimize risks
7. Following mandated travel lanes
8. Considering supply chain velocity needs for the voyage III. Materials 603
1. Reflecting goods carried
2. Reflecting goods perishability
3. Positioning of load
4. Reflecting value of goods
5. Reflecting relative value of goods
6. According to security and inspection
7. Opportunity costs
8. Supply chain velocity IV. Order Priority 604
1. Meeting schedule priorities
2. Optimizing delivery timetables
3. Offloading perishables
4. Maximizing profits
5. Minimizing potential losses
6. Terms of carriage
7. Supply chain velocity requirements V. Support Schedule 605
1. Port slot availability
2. Mothership vessel availability
3. Personnel availability
4. Tug and tow availability
5. Harbor guide availability
6. Truck or train availability
7. Reverse logistics
8. Supply chain velocity requirements One embodiment of the inventive concept modifies the selected route and pace of travel based on conditions, conditions including at least one or more of the supply chain velocity requirements for the voyage, weather, currents, traffic, regulations, and geopolitical situations, traffic including the movement of other vessels and geopolitical including such risks as navigating around war zones.

Figure 7:
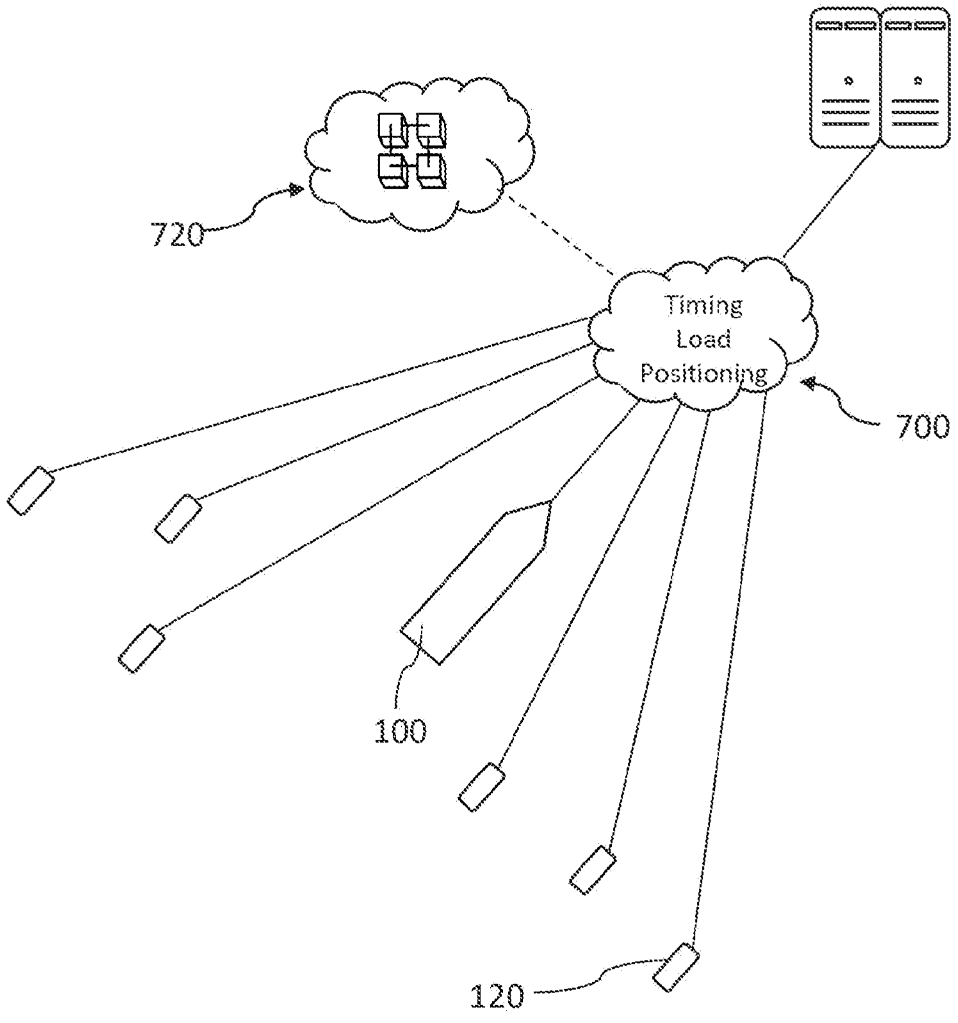
FIG. 7 illustrates a representative load optimization program and system.

FIG. 7 illustrates that the system and method for transporting a cargo and containers includes a load optimization program 700 on at least one computer platform designed to optimize 1) the at least one or more timing, loading, and positioning of cargo and containers onto the deployable and retrievable vessels 120; 2) timing, loading, and positioning of the deployable and retrievable vessels 120 onto the mothership vessel 100; 3) the at least one or more optimal positions for the mothership vessel 100 to receive the deployable and retrievable vessels 120; and 4) the at least one or more optimal positions for the mothership vessel 100 to release the deployable and retrievable vessels 120. Such calculations may be shared with, and some calculated by, as illustrated in FIG. 8, the logistics management program 800 and a route optimization program 850 designed to optimize supply chain velocity requirements of the shippers and cargo owners for that particular voyage. The load optimization program 700 has, as a direction, to allow cargo and containers 140 to be loaded in a way so as to avoid having to offload and reload or reposition cargo and containers 140. The logistics management program 800 may be considered an umbrella program that incorporates any combination of programs referenced herein and may interface with any combination of programs referenced herein.

The integrity and security of the load optimization program 700 may further be enhanced by blockchain 720 to track and verify cargo and containers 140. Blockchain 720 affords immediate, unalterable, and transparent information to share throughout the associated supply chain of which the system and method for transporting cargo and containers across a body of water is a part.

Blockchain is a digital database containing information (such as changes of custody of cargo and containers 140) that can be simultaneously used and shared within a large, decentralized, publicly accessible network. As used herein, in some embodiments, the term blockchain may refer to one or more of a hash chain, a hash tree, a distributed database, and a distributed ledger that could present a cryptographically verifiable ledger. In some embodiments, blockchain may further refer to systems that use one or more of cryptography, private/public key encryption, proof standard, distributed timestamp server, and inventive schemes to regulate how new blocks may be added to the chain to optimize overall velocity for each voyage and for other purposes such as cargo and container 140 tracking.

FIG. 8 illustrates the logistics manager program 800, which may interface with the at least one or more of a land transportation system 830, the logistics manager program 800 further interfacing with at least one maritime navigation system 840. The logistics manager program 800 may interface with systems and programs from multiple enterprises. The route optimization program 850 in one embodiment is at least one or more of 1) a part of and 2) interfaced with the logistics manager program 800 and includes an at least one algorithm that assigns the route 500 of transit for cargo and containers 140 up to all the way from cargo origin to insertion into containers and to the deployable and retrievable vessels 120, the optimal coordinates for releasing and retrieving deployable and retrievable vessels 120 into the mothership vessel 100, the route of the mothership vessel 100, the associated routes of deployable and retrievable vessels 120, the logistics manager program possibly extending into the land logistics of moving cargo and containers 140 from the loading and receiving ports to their final destinations. This algorithmic driven system allows cargo and containers 140 to be transported from origin to end point delivery and every point along the route to assure a constant supply chain velocity through the course of transit. Another embodiment of the route optimization program 850 is limited to calculating the routes of travel 500 of the at least one deployable and retrievable vessels 120 and the mothership vessel 100.

Figure 9:
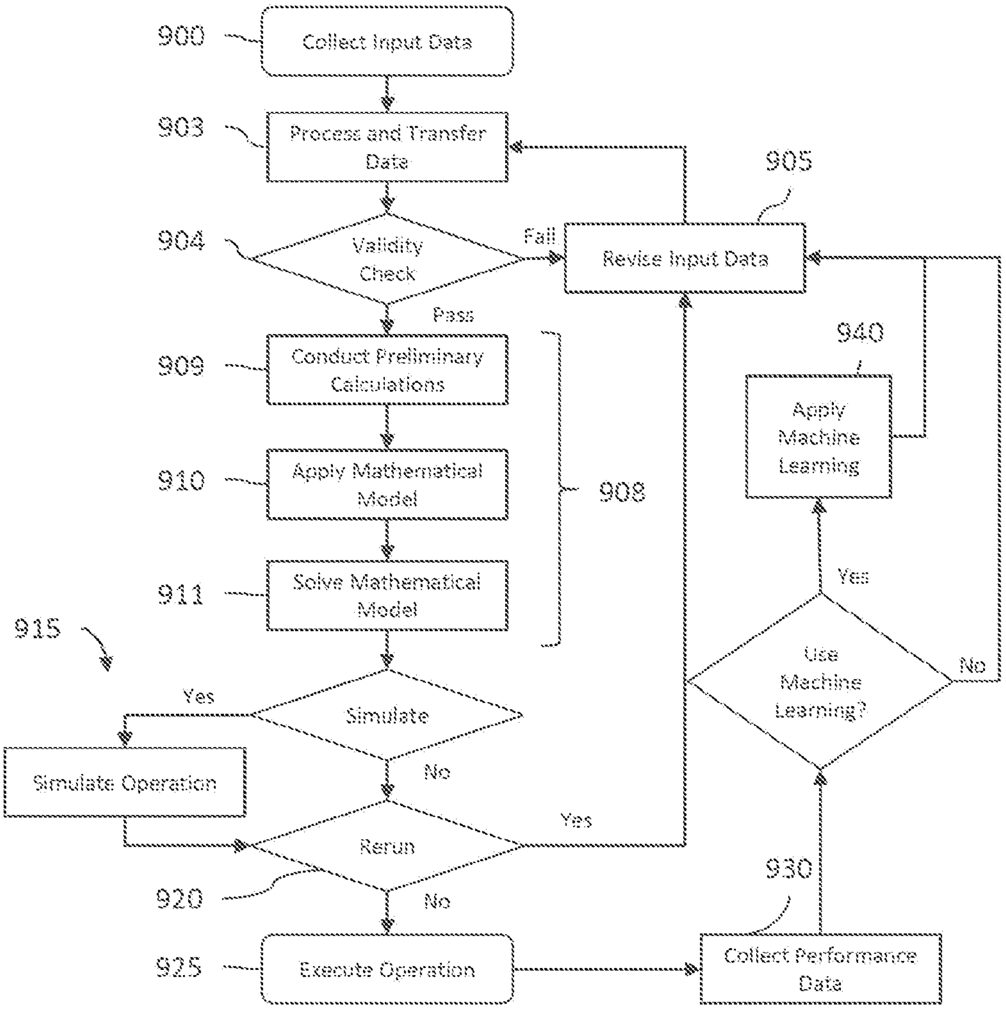
FIG. 9 illustrates a representative method of calculating an optimized route for the mothership vessel and associated deployable and releasable vessels.
Figure 10A:
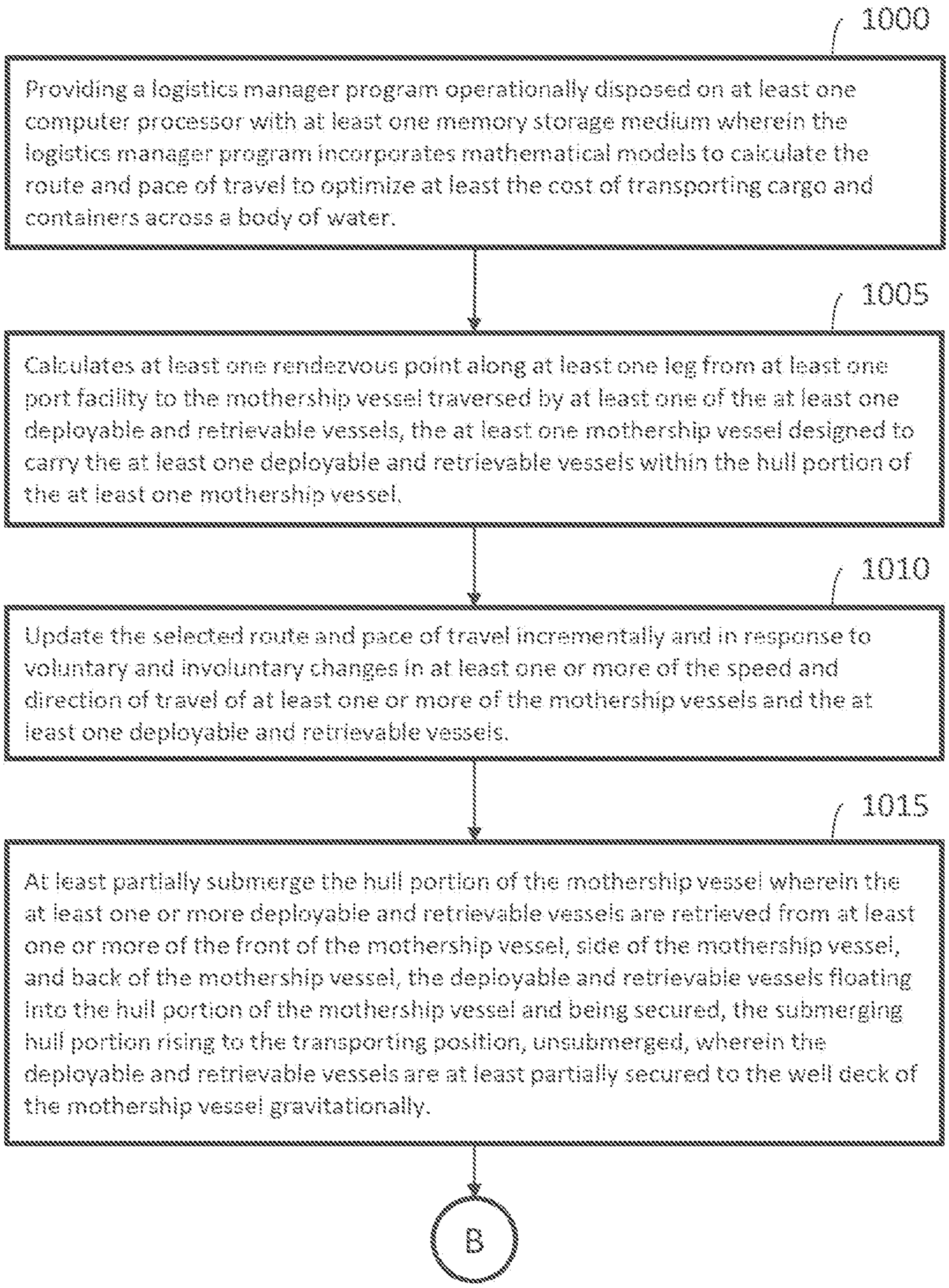
FIG. 10A to 10D illustrate a representative method of deploying and retrieving deployable and releasable vessels from the mothership vessel.
Figure 10B:
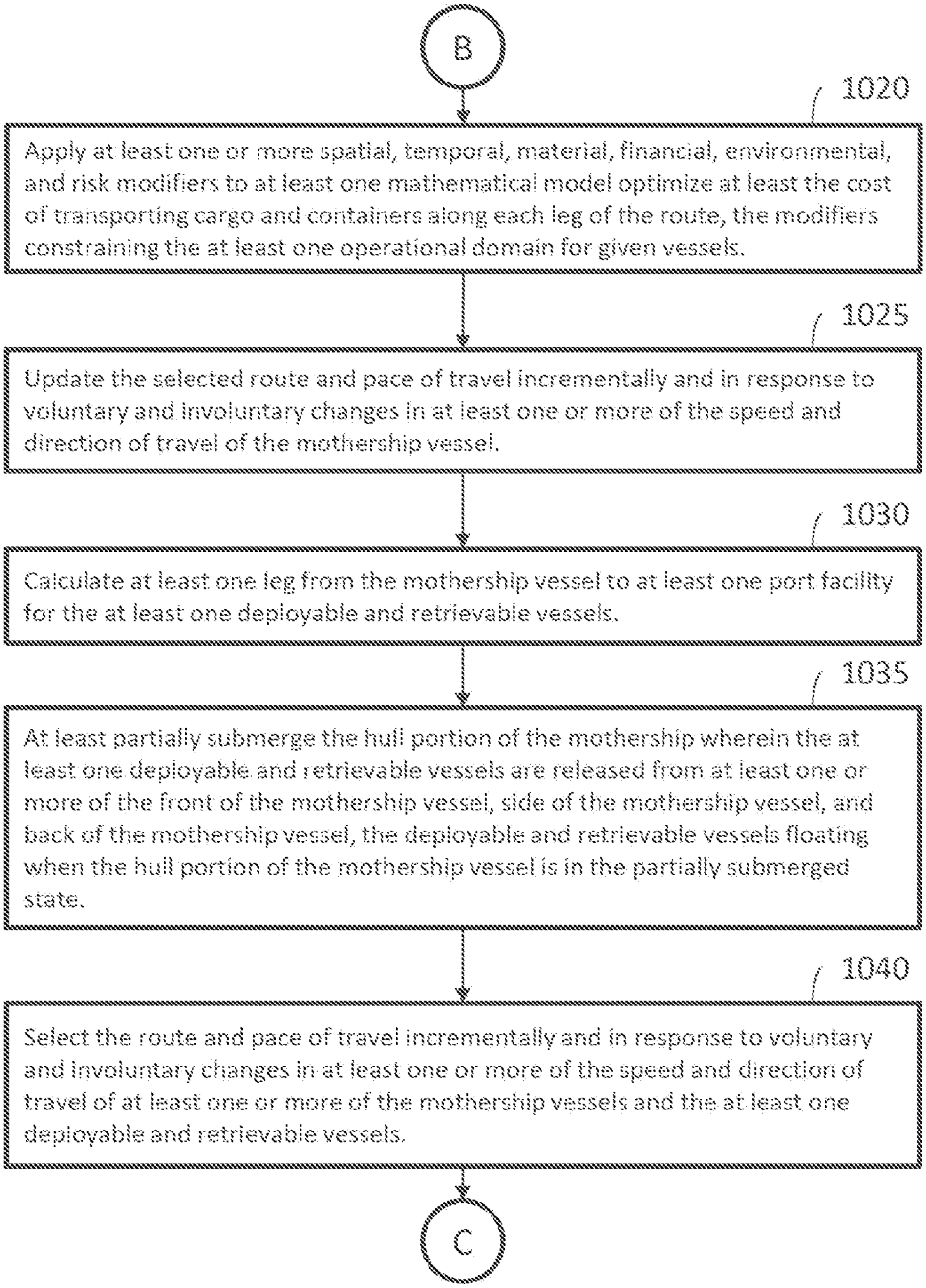
Figure 10C:
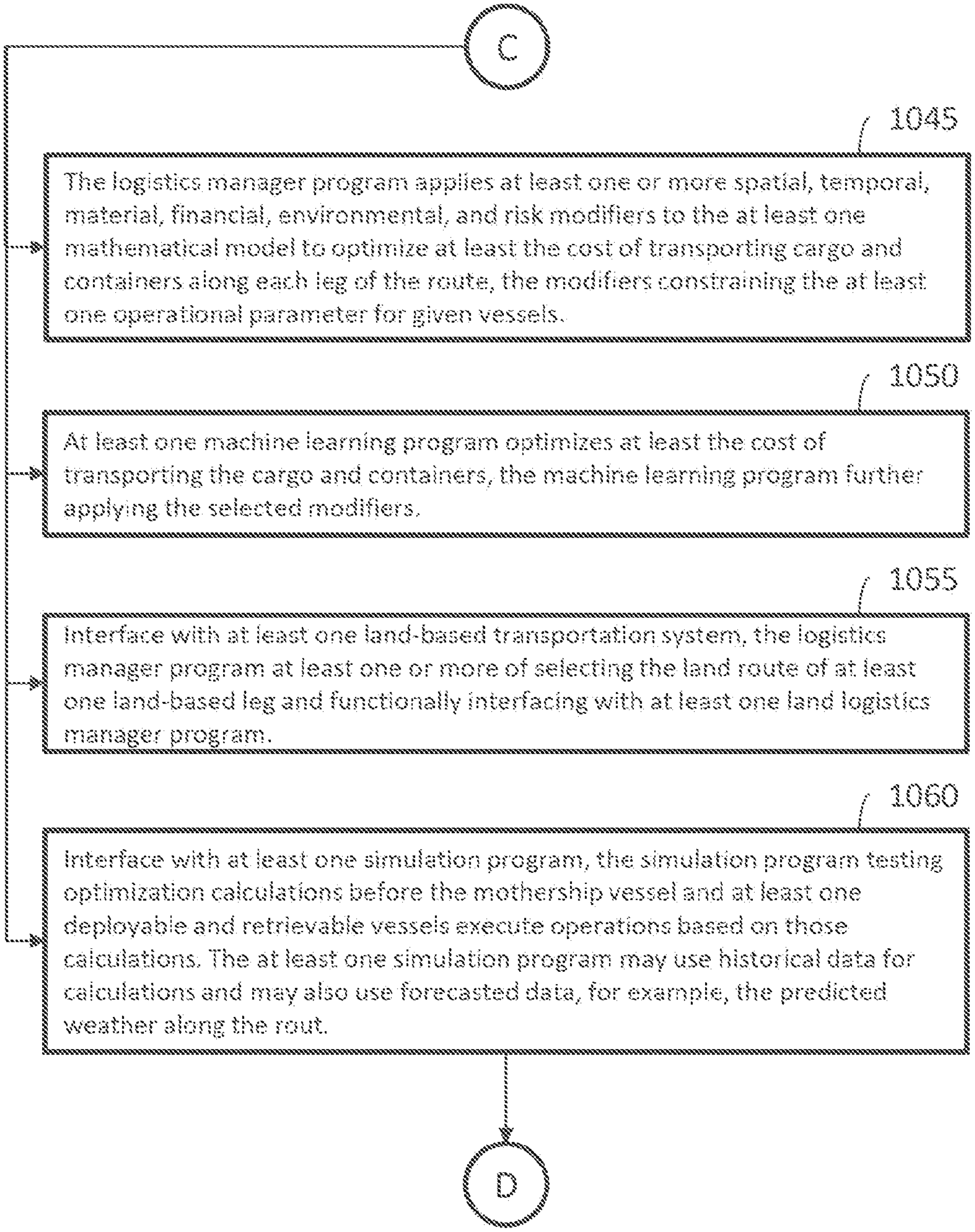
Figure 10D:
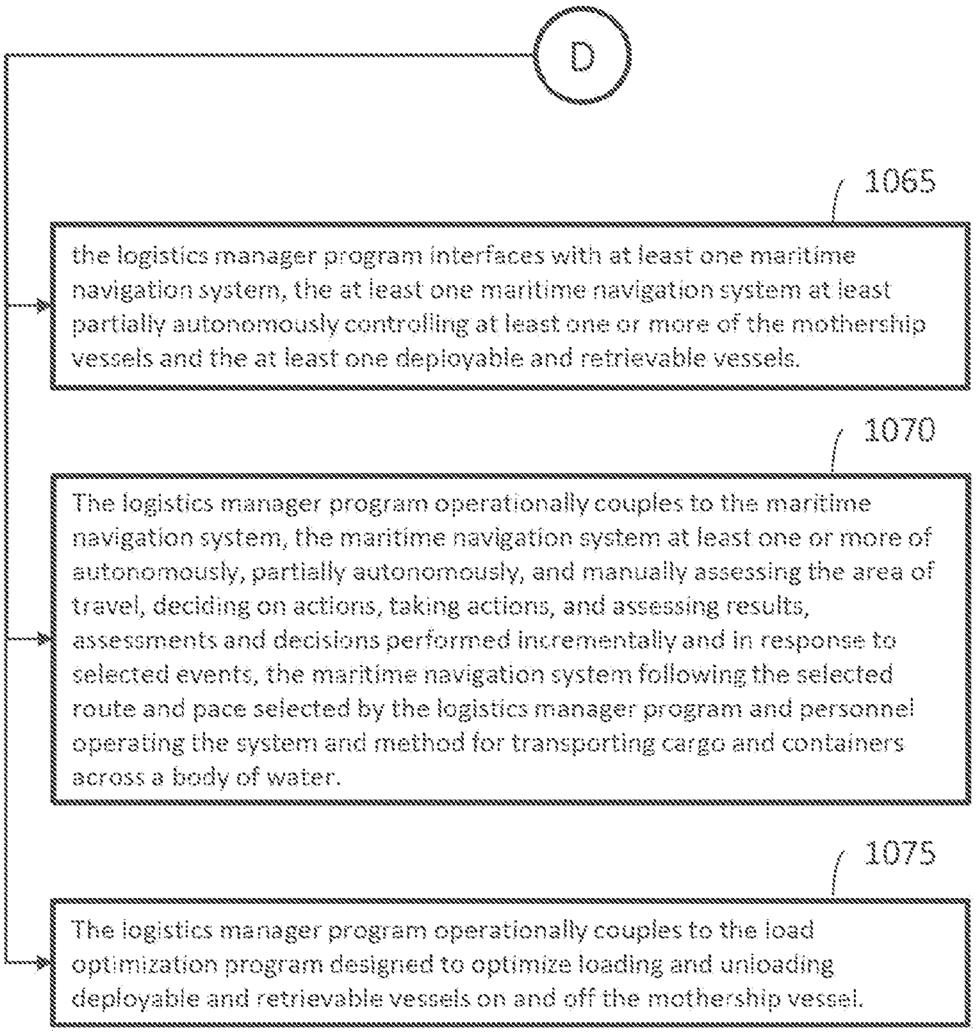

Mathematical models 908, as represented in FIG. 9, for the route optimization program 850 include, but are not limited to, route optimization algorithms that include multiple variables and calculations from those variables derived to predict maximum and minimum values where minimum costs weighted by modifiers can be derived and overall supply chain velocity can be optimized. In the preferred embodiment, the rendezvous points 501 and release points 502 are calculated to reduce costs, which may differ, for example, from minimizing the distance traveled by independently moving deployable and retrievable vessels 120. The mathematical models account for differences in the cost to move cargo and containers 140 via independently moving deployable and releasable vessels 120 and movement when deployable and releasable vessels 120 are secured aboard a mothership vessel 100, and calculations may include multiple mothership vessels 100 and pluralities of deployable and retrievable vessels 120 wherein, for example, the mothership vessel 100 may release deployable and retrievable vessels 120 and retrieve different deployable and retrievable vessels 120 instead of waiting on the deployable and retrievable vessels 120 just released.

One embodiment of the inventive concept uses at least one mathematical model 908 wherein k=cost proportionality constant per unit distance ku=cost per unit of distance of deployable and releasable vessels traveling from port to a mothership vessel kv=cost per unit of distance of the mothership vessel traveling from rendezvous point to rendezvous point kw=cost per unit of distance of deployable and releasable vessels from the mothership vessel to port $DRV_{ny}$=distance from leg port to the mothership vessel for inbound deployable and releasable vessels $y_n$ $MSV_x$=distance from rendezvous point to release point for the mothership vessel $DRV_{nz}$=distance from the mothership vessel to port for outbound deployable and releasable vessels $z_n$ Where $y_n$, x, $z_n$ distances (→PQ) are independently calculated for each representative vessel.

C=the cost to be optimized where the representative mathematical model 908 is substantially in the framework: $C=(ku*(DRV_{1y}+DRV_{2y} \ . \ . \ . \ DRV_{ny}))+(kv*MSV_x)+(kw*(DRV_{1z}+DRV_{2z} \ . \ . \ . \ DRV_{nz}))$. Other mathematical models may be used.

Cost includes operational costs such as fuel costs and may include commercial costs such as charter costs. Any variable that affects expenditures may be included in cost calculations for resources including, but not limited to, costs of time, money, space, material, energy, information, function, maintenance, personnel, security, taxes, licenses, port fees, tariffs, mooring, docking, penalties, fines, tolls, rights-of-passage, canal usage, and navigation and supply chain velocity the speed of which affects the cost of the cargo in the containers since it determines when the cargo is available for sale and profit for its owner or shipper.

One embodiment of the route optimization program 850 interfaces with the load optimization program 700 and modifies the selected load schedule 606, the load schedule 606 based on at least one or more of the planned order of deployments and modified by load considerations for travel by the mothership vessel 100, circumstances effecting optimal arrival time for the mothership vessel 100, and security and inspections.

The at least one or more optimal positions for retrieving and releasing deployable and retrievable vessels 120 are calculated from variables including 1) the distances the deployable and retrievable vessels 120 would be required to travel to respective destinations to and from the mothership vessel 100; 2) the optimal timing for delivery of cargo and containers 140; 3) the cargo and containers 140 being carried by given deployable and retrievable vessels 120; 4) risks associated with cargo and containers 140 carried by the deployable and retrievable vessels 120; 5) the load pattern of the containers on the deployable and retrievable vessels 120 and on the mothership vessel 100; 6) economic prioritization assigned to disclosed systems and vessels such as daily charter costs and identified supply chain velocity requirements for the particular voyage not otherwise considered above.

The inventive concept is designed to eliminate a problem caused by the limited number of ports and terminals available to load and discharge containerized cargo on ships of more than 12,000 TEUs, the number of usable ports and terminals diminishing as the size of ships grows larger. Generally, larger container ships can cross oceans more efficiently—at a lower cost—per TEU than smaller, individual container ships, economics having driven enterprises to operate bigger ships and to optimize loads and consolidate operators, thereby gaining more control over how a block of cargo and containers 140 will be transported by sea. In one embodiment of the inventive concept, the deployable and retrievable vessels 120 carry about 3,000 TEUs, though the system is scalable and larger or smaller other load limits for the deployable and retrievable vessels 120 may be used. When fully loaded with six deployable and retrievable vessels 120, in this representative embodiment, the mothership vessel 100 would carry the equivalent of a large container ship at 18,000 TEUs. Ports and terminals for loading and discharge of containers may be up rivers and so the inventive concept could, for example, allow the exemplary mothership vessel 100 loaded by a representative complement of six deployable and retrievable vessels 120, to functionally service a city such as St. Louis, MO, directly by having the mothership ballast down and float off its deployable and retrievable vessels 120 which continue a journey of their carried cargo and containers 140 from the Gulf of Mexico and up the Mississippi River, this allowing an inland city such as Memphis and St. Louis to have functionally the same waterborne access to a large container ship as that which has been limited to such cities as Los Angeles.

One embodiment of the inventive concept involves inland route optimization wherein a fourth leg of travel can be added to the mathematical model 908 that accounts for river travel. This embodiment adds the variables kr=cost per unit of distance of river travel by deployable and releasable vessels 120 (possibly with added modifiers "us" and "ds" for upstream travel and downstream travel relative to river currents) and $DRV_{nr}$=distance substantially from a river mouth to a receiving port upstream. Whereas previous variables apply primarily to maritime logistics, these additional variables extend the inventive concept, functionally, into land-based logistics given that the costs of moving containers upriver could be compared to land-based logistics alternatives such as moving cargo and containers 140 from a coastal port by truck or train, the aggregate which may be termed inland logistics. Upriver travel could shorten inland legs for both producers and receivers, for illustration, an automobile factory or bulk producer that could substantially fill a releasable and deployable vessel 120 near the source of production from truck to ship rather than from truck to train to ship or an inland superstore region that could absorb all or a portion of the content carried by a given releasable and deployable vessel 120 from a riverside city. Users of the inventive concept could, therefore, extend their logistics reach further into the supply chain at both ends while still staying within their domain of waterborne travel.

The inventive concept is designed to allow the disclosed system and method for transporting cargo and containers across a body of water to achieve 1) the benefits of a cargo and container ship designed to transport more than 12,000 TEUs when the ship is crossing a body of water while also having 2) the benefits of smaller cargo and container ships when at or in the vicinity of ports for loading and discharging cargo and containers 140. The system and method for transporting cargo and containers across a body of water can, therefore, exhibit one parameter in one location, operating as a supersize container ship, and another parameter in another location, operating as a small container ship, when the supersize containerships in use now cannot be both.

The system and method for transporting cargo and containers across a body of water can be both large and small, eliminating tradeoffs cargo and container carriers otherwise make by selecting a ship capable of carrying more than 12,000 TEUs or selecting smaller vessels. Each element of the system and method for transporting cargo and containers across a body of water can then be partitioned, and its parts reassembled to optimize loading, transport, and delivery of cargo and containers 140, to include, but not be limited to, where and when deployable and retrievable vessels 120 are deployed and dispersed to or from the mothership vessel 100, where and when cargo and containers 140 are added to or removed from deployable and retrievable vessels 120, and where and when materials are added to or removed from the cargo and containers 140. Further, the mothership vessel 100 in some embodiments may carry one, two, or another combination of deployable and retrievable vessels 120 while other portions of the mothership vessel 100 may carry cargo and containers 140 in traditional ways and be used for other purposes such as for military logistics and carriage of other vessels on its well deck.

Operations of the mothership vessel 100 and the deployable and retrievable vessels 120 are essential for the function of the system and method for transporting cargo and containers across a body of water and are enhanced by the load optimization program 700, which manages the loading and movement of cargo and containers 140 from points of origin to ultimate delivery destinations. In some embodiments, the management of movement of cargo and containers 140 through the system for transporting cargo and containers across a body of water may extend to land and trucking systems as might be required for an end-to-end logistics system. In other embodiments, tracking may go to individual products from origin to last-mile delivery points and to end-customers. The system and method for transporting cargo and containers across a body of water may deploy blockchain 720 to aid in tracking cargo and containers 140 up to the granularity of individual product components and raw materials.

Other embodiments of the inventive concept are limited to managing overwater transport substantially from a port where at least one cargo and container 140 is loaded onto a deployable and retrievable vessel 120 to the port where the at least one cargo and container 140 is offloaded from the deployable and retrievable vessel 120. In these embodiments, a plug-in may be derived to communicate with other distribution systems for tracking a given cargo and containers 140 through the system and method for transporting cargo and containers across a body of water, parts of the system dealt with separately and reassembled as best to transport the given cargo and containers 140 along the selected route. Tasks may be sequential, such as releasing deployable and retrievable vessels 120 from the mothership vessel 100, or tasks may be executed in parallel, as may be further facilitated by the ability to carry deployable and retrievable vessels 120 traveling to different ports where they could be offloaded at substantially the same time. The system and method for transporting cargo and containers across a body of water, therefore, includes a structure that leverages the mothership vessel 100 and may leverage a plurality of mothership vessels 100, the deployable and retrievable vessels 120 carried by the mothership vessel 100 or the plurality of mothership vessels 100, the whole of which transports cargo and containers 140 from at least one point of origin to at least one destination, the whole of which may be logic-trained as one coordinated system.

One embodiment of the system and method for transporting cargo and containers across a body of water includes at least one mothership vessel 100. In this exemplary embodiment, the mothership vessel 100 is designed to be about 1500 feet long, but the system is scalable. In this representative embodiment, the mothership vessel 100 carries six deployable and retrievable vessels 120, each capable of carrying the equivalent of 3000 TEUs. The deployable and retrievable vessels 120 can call at ports and terminals well up-rivers from the sea and sail down-rivers and well out to sea where the mothership vessel 100 awaits well away from the ports and terminals. The deployable and retrievable vessels 120 float onto the mothership vessel 100 by using heavy-lift technology in which the well-deck of the mothership vessel 170 floods, the deployable and retrievable vessels 120 float on and are locked together, at which time the mothership vessel 100 de-ballasts and departs for its overseas destination point.

In the representative embodiment, on arrival at a predetermined but variable latitude and longitude coordinate focused on the supply chain velocity sought to be maintained for the voyage, the designated deployable and retrievable vessels 120 bearing cargo and containers 140 arrive to float onto the mothership vessel which then de-ballasts and departs on its ocean voyage at the optimal speed for supply chain velocity given the factors discussed above as calculated by the algorithm discussed above and for the cargo and containers 140 carried aboard the deployable and retrievable vessels 120. Upon arriving at its destination determined coordinate, the mothership vessel 100 again ballasts down, floods its well-deck 170, and floats off the deployable and retrievable vessels 120 bearing their cargo and containers 140. The timing and costs of deploying and retrieving deployable and retrievable vessels 120 at the coordinates may be included in mathematical models. The logistics manager program 800 and associated programs are designed to select latitudes and longitudes to optimize at least one parameter, in a representative embodiment, the parameter to minimize the cost of transporting cargo and containers 140 through the system and optimizing the cargo's supply chain velocity. After the deployable and retrievable vessels 120 depart the mothership vessel 100, the mothership vessel 100 can then float on deployable and retrievable vessels loaded with cargo and containers for the mothership's next destination and the process is repeated.

In one embodiment, the outgoing deployable and retrievable vessels 120 loaded with cargo and containers 140 await the arrival of the mothership vessel 100 at the designated pre-determined latitude and longitude to be floated aboard and locked down for the outgoing destination of the mothership vessel 100 utilizing the same process of ballasting down-float-off, float-on, and departure assisted by the algorithm's analysis of the next voyage for that mothership vessel 100 and its complement of deployable and retrievable vessels 140. The entire process of floating off the destination deployable and retrievable vessels 120 and floating on those for the outgoing voyage takes about 24 hours This process of arrival, float off, float on allows the mothership vessel 100 to avoid having to enter congested ports. Instead, it remains many, even hundreds of miles offshore.

One embodiment of the inventive concept may further apply at least one or more use of alternative propulsion and power for the mothership vessel 100 as the best available to minimize detrimental environmental consequences and meet current and future standards for clean propulsion such as powerplants fueled by, for example, liquified natural gas (LNG), methane, ammonia, or other fuels, therefore, releasing fewer harmful byproducts than a comparable embodiment of a cargo and containership.

FIG. 8 further illustrates that the logistics manager program 800 may operationally interface with other software programs such as weather routing and voyage optimization, vessel performance monitoring, vessel maintenance systems, and systems for reducing fuel consumption. These include, but are not limited to, addressing involuntary speed changes due to changed resistance from the onset of wind and waves, and voluntary speed changes due to navigation hazards or fear of heavy weather damage resulting from excessive ship motion, propeller racing, and slamming or boarding seas.

In one representative embodiment of the inventive concept, six deployable and retrievable vessels 120, when floated off the mothership vessel 100, are at least one or more of towed, pushed, and self-propelled. When self-propelled, the deployable and retrievable vessels 120 may include one or more of the fuels described above or hybrid fuel and electric, and even battery powered engines for propulsion to its particular terminal. One representative embodiment of the deployable and retrievable vessels 120 is a deployable and retrievable vessel 120 drafting about 23 feet when laden with cargo and containers 140 and is designed to travel at about 12 knots when at sea, the representative size of this deployable and retrievable vessel 120 allowing it to serve ports and terminals inland on major rivers, thereby avoiding at least some roads and rails and congestion thereon. After floating off the mothership vessel 100, the deployable and retrievable vessels 120 can transit to 6 different ports and terminals simultaneously for parallel processing of cargo and containers 140.

Because deployable and retrievable vessels 120 can be designed to carry 53-foot cargo and containers as well as traditional 20-40-foot containers, 140, cargo and containers 140 can be unloaded from the deployable and retrievable vessels 120 and connected to road and rail systems for delivery to distribution facilities without requiring trans-loading of cargo from 20- and 40-foot cargo containers 140 to which the supersized containerships are restricted. These 53-foot (US) cargo and containers 140 may either for use on road and rail within the destination country, for example in the United States, as the largest size allowed under federal law or returned to the ocean transit system either empty or reloaded with ocean transit cargo. While the preferred embodiment for the inventive concept uses 53-foot containers, the gamut of container sizes and types may be used, to include, but not be limited to 20-foot, 40-foot, 45-foot (European), such sizes including standard (enclosed) containers, refrigerated containers, rack containers, all of which may be considered cargo and containers 140. Some embodiments of the use of the deployable and retrievable vessels may include interior decks for roll on and roll off automobiles or military vehicles. Another embodiment of the deployable and retrievable vessels 120 may be for the carriage of dry bulk and project cargos.

FIG. 9 illustrates a method for transporting cargo and containers across a body of water, the method including the step of 900 collecting input data for vessel characteristics 100, 120, cargo and container 140 loading and off-loading, cargo and container 140 loading conveyance, weather-route calculations and variable supply chain velocity needs for the cargo to be carried on the voyage, the step of 903, transferring that data to the at least one computer system 400 to conduct the step of 904, a validity and integrity check of data that will be used for the at least one mathematical model 908. Upon passing the validity and integrity of the data 904, the method includes the step of 909, conducting preliminary calculations to optimize the planned route of travel for the at least one mothership vessel 100 and at least one deployable and releasable vessel 120, rendezvous points 501 for the at least one deployable and retrievable vessels 120, and release points 502 for the at least one deployable and retrievable vessels 120. The method further includes the step of 910, applying at least one mathematical model 908 and the step of 911, solving optimizing the cost and pace of moving cargo and containers 140 across a body of water, further applying modifiers 600 associated with at least one or more of time, space, materials, order priority, and support schedules, all with the objective of the most effective and efficient supply chain velocity for the cargo and containers 140. The method may further include the step of 905, revising input data.

FIG. 9 further illustrates that the method for transporting cargo and containers across a body of water may further include the step of 915, simulating solutions to optimize the cost and supply chain velocity of moving cargo and containers 140 across a body of water before putting those calculations into operation.

FIG. 9 further illustrates that the method for transporting cargo and containers across a body of water may further include the step of 920, rerunning the at least one mathematical model 908 with at least one or more of modified data and data calculations before the step of 925, executing operations, and the step of 930, collecting performance data.

FIG. 9 further illustrates that he method for transporting cargo and containers across a body of water may include the step of 940, applying machine learning wherein the system and method of transporting cargo and containers 140 may be improved regarding at least one or more of assessing the data, analyzing the data, and employing the data, and the framework from which to at least one or more of create, run, and test mathematical models 908 and associated modifiers to reduce the cost and increase the pace of cargo and container transit by the mothership vessel 100 and the at least one deployable and retrievable vessel 120.

Machine learning includes learning tools and simulation models to facilitate desired key performance indicators of the given user, including but not limited to decision trees, neural networks, Bayesian models, and genetic algorithms. The decision trees, neural networks, Bayesian models, and genetic algorithms may, in some embodiments, be derived from preset or partially preset libraries. Machine learning is a part of artificial intelligence.

FIG. 9 further illustrates that the method for transporting cargo and containers across a body of water may include the step of applying blockchain 740 to cargo and containers 140 as identifiers of cargo and container items, cargo and containers 140, and actions associated with moving cargo and container items and cargo and containers 140. Machine learning 940 may extend to anticipatory shipping, which is facilitated by servicing each given port with deployable and releasable vessels 120 for which cargo and containers in the supply chain 140 can be optimized. Anticipatory shipping allows suppliers to supply goods ahead of orders from customers based on degrees of statistical certainty those goods will be needed so that the needed cargo and containers are already underway before firm orders are received.

Mathematical models 908 include, but are not limited to, route optimization algorithms that include multiple variables and calculations from those variables derived to predict maximum and minimum values where minimum costs weighted by modifiers can be derived and factors critical to the velocity of the supply chain can be optimized. In one embodiment of the inventive concept, the rendezvous points 501 and release points 502 are calculated to optimize supply chain velocity and reduce costs, which may differ from averaging the distance traveled by independently moving deployable and retrievable vessels 120, for example, requiring some deployable and retrievable vessels 120 to travel several times the distance of other deployable and retrievable vessels 120 from the given release point 502. The at least one mathematical models 908 account for differences in the cost to move cargo and containers via independently moving deployable and releasable vessels 120 and movement when deployable and releasable vessels 120 are secured aboard the mothership vessel 100, and calculations may include multiple mothership vessels 100 and pluralities of deployable and retrievable vessels 120 wherein, for example, the mothership vessel 100 may release deployable and retrievable vessels 120 and retrieve a different set of deployable and retrievable vessels 120 instead of waiting on the removable and deployable vessels 120 just released.

FIG. 10A-10D illustrate a method for transporting cargo and containers across a body of water, the method including the step of 1000 the logistics manager program 800 operationally disposed on at least one computer processor 400 with at least one memory storage medium 402 wherein the logistics manager program 800 incorporates the at least one mathematical models 908 to calculate the route and pace of travel to optimize at least the velocity of the supply chain for that vessel and its cost of transporting cargo and containers 140 across a body of water. The method further includes the step of 1005, calculating at least one rendezvous point 501 along at least one leg from at least one port facility to the mothership vessel 100 traversed by at least one of the at least one deployable and retrievable vessels 120, the mothership vessel 100 designed to carry the at least one deployable and retrievable vessels 120 within the well-deck of the mothership vessel 103. The method further includes the step of 1010, updating the selected route 500 and pace of travel incrementally and in response to voluntary and involuntary changes in at least one or more of the speed and direction of travel of the mothership vessels 100 and the at least one deployable and retrievable vessels 120.

FIG. 10A-10D further illustrate that the method for transporting cargo and containers across a body of water includes the step of 1015, the mothership vessel 100 partially submerging the hull portion of the mothership vessel 101 wherein the at least one or more deployable and retrievable vessels 120 are retrieved from at least one or more of the bow of the mothership vessel 111, side of the mothership vessel 115, and stern of the mothership vessel 119, the deployable and retrievable vessels 120 floating on to the well-deck of the interior of the mothership vessel 103 and being secured, the submerging hull portion 101 deballasted and rising to the transporting position, wherein the deployable and retrievable vessels 120 are partially secured to the well-deck of the mothership vessel 170 at least partially gravitationally and may also use other mechanical means such as, but not limited to, clamps, pins, cables, chains, and interlocking joints. The method further includes the step of 1020, calculating at least one leg wherein the mothership vessel 100 traverses a body of water while carrying at least one of the deployable and retrievable vessels 120 to at least one release point 502.

FIG. 10A-10D further illustrate that the method for transporting cargo and containers across a body of water includes the step of 1025, the logistics manager program 800 updating the selected route 500 and pace of travel incrementally and in response to voluntary and involuntary changes in at least one or more of the speed and direction of travel of the mothership vessel 100. The method for transporting cargo and containers across a body of water further includes the step of 1030, calculating at least one leg from the mothership vessel 100 to a latitude and longitude best suited to the float off all deployable and retrievable vessels for travel to at least one port facility suitable for the supply chain velocity of the cargo and containers 140 being carried on that particular mothership vessel 100. The method further includes the step of 1035, the mothership vessel 100 partially submerging the hull portion of the mothership vessel 101 wherein the at least one deployable and retrievable vessels 120 are released from the bow of the mothership vessel 111, side of the mothership vessel 115, and stern of the mothership vessel 119, the deployable and retrievable vessels 120 having become afloat when the hull portion of the mothership vessel 100 is in the partially submerged state. The method further includes the step of 1040, selecting the route 500 and pace of travel incrementally and in response to voluntary and involuntary changes in at least one or more of the speed and direction of travel of at least one or more of the mothership vessels 100 and the at least one deployable and retrievable vessels 120.

FIG. 10A-10D further illustrate that the method for transporting cargo and containers across a body of water may include the step of 1045, the logistics manager program 800 applying at least one or more spatial, temporal, material, financial, environmental, risk modifiers and supply chain velocity requirements to the at least one mathematical model 908 to optimize at least the cost of transporting cargo and containers 140 and supply chain velocity along each leg of the route 500, the modifiers constraining the at least one operational parameter for given vessels 100, 120.

FIG. 10A-10D further illustrate that the method for transporting cargo and containers across a body of water may include the step of 1050, at least one machine learning program optimizing 740 at least the cost of transporting the cargo and containers 140 and supply chain velocity optimization requirements, the machine learning program 740 further applying the selected modifiers 600.

FIG. 10A-10D further illustrate that the method for transporting cargo and containers across a body of water and the algorithm guiding it may include the step of 1055 interfacing with at least one land-based transportation system 830, the logistics manager program 800 at least one or more of selecting the land route 831 of at least one inland leg and functionally interfacing with at least one land logistics manager program.

FIG. 10A-10D further illustrate that the method for transporting cargo and containers across a body of water may include the step of 1060, interfacing with at least one simulation program 915, the simulation program 915 testing optimization calculations before the mothership vessel 100 and at least one deployable and retrievable vessels 120 execute operations based on those calculations. The at least one simulation program 915 may use historical data for calculations and may also use forecasted data, for example, the predicted weather along the route 500.

FIG. 10A-10D further illustrate that the method for transporting cargo and containers across a body of water may include the step of 1065, the logistics manager program 800 interfacing with at least one maritime navigation system 840, the at least one maritime navigation system 840 at least partially autonomously controlling at least one or more of the mothership vessels 100 and the at least one deployable and retrievable vessels 120.

FIG. 10A-10D further illustrate that the method for transporting cargo and containers across a body of water may include the step of 1070, the logistics manager program 800 operationally coupling to the maritime navigation system 840, the maritime navigation system 840 at least one or more of autonomously, partially autonomously, and manually assessing the area of travel, deciding on actions, taking actions, and assessing results, assessments and decisions performed incrementally and in response to selected events, the maritime navigation system 840 following the selected route 500 and pace selected by the logistics manager program 800 and personnel operating the system and method for transporting cargo and containers across a body of water.

FIG. 10A-10D further illustrate that the method for transporting cargo and containers across a body of water may include the step of 1075, the logistics manager program 800 operationally coupling to the load optimization program 700 designed to optimize loading and unloading deployable and retrievable vessels 120 on and off the mothership vessel 100.

The following patents are incorporated by reference in their entireties: U.S. Pat. Nos. 3,918,380, 8,019,617, 8,321,354, 8,494,976, 8,935,174, 10,922,981, 11,080,652, US2018374033, US2020167726, WO21111036, CN109447547B, CN110749890A, Advanced Route Optimization in Ship Navigation, Ei-ichi Kobayashi, Syouta Yoneda and Atsushi Morita Graduate School of Maritime Sciences, Kobe University, 5-1-1 Fukaeminami, Higashinadaku, Kobe, Japan; Optimizing Ship Routing to Maximize Fleet Revenue at Danaos, Interfaces, Vol. 43, No. 1, January-February 2013, pp. 37-47 ISSN 0092-2102 (print) ISSN 1526-551X (online), Takis Varelas, Sofia Archontaki Danaos, Piraeus, Greece, John Dimotikalis Technological Education Institute of Crete, Crete, Greece, jdim@staff.teicrete.gr Osman Turan, Iraklis Lazakis University of Strathclyde, Glasgow, United Kingdom, Orestis Varelas Anangel Maritime Services Inc., Piraeus, Greece; Ship weather routing: A taxonomy and survey Thalis P.V.ZisHarilaos N.PsaraftisLiDing Department of Management, Technical University of Denmark, Akademivej, 2800, Kgs. Lyngby, Denmark; Development of a New Ship Adaptive Weather Routing Model Based on Seakeeping Analysis and Optimization, Journal of Marine Science and Engineering, Journal of Heuristics (2020) 26:801-825, Silvia Pennino, Salvatore Gaglione, Anna Innac, Vincenzo Piscopo and Antonio Scamardella Department of Science and Technology, University of Naples "Parthenope", Centro Direzionale Isola C4, 80143 Naples, Italy; A genetic algorithm for finding realistic sea routes considering the weather Stefan Kuhlemann1,2. Kevin Tierney1 Received: 29 Jan. 2019/Revised: 9 Jul. 2020/Accepted: 11 Jul. 2020/Published online: 23 Jul. 2020; Voyage Optimization Supersedes Weather Routing by Henry Chen, Ph.D. Chief Naval Architect, Boeing Associate Tech Fellow Jeppesen Marine Inc., a Boeing Company; Optimal Container Routing in Liner Shipping Networks Considering Repacking 20 ft Cargo and containers into 40 ft Cargo and containers, Research Article-|Open Access Volume 2017|Article ID 8608032. Shuaian Wang, Xiaobo Qu, Tingsong Wang, and Wen Yi; Container route optimization in a sea-rail intermodal network Y. ZHAO & X. ZHANG & Q. W. XUE School of Traffic and Transportation, Beijing Jiaotong University, Beijing, China; X. Yifan, W. Zhengguo, Z. Yu and Y. Ying, "Study on Route and Scheduling Optimization of Inland River Container Liner Ship Based on Interval Number Programming," 2019 *5th International Conference on Transportation Information and Safety* (*ICTIS*), 2019, pp. 1105-1110, doi: 10.1109/ICTIS.2019.8883833;

While the inventive concept has been described above in terms of specific embodiments, it is to be understood that the inventive concept is not limited to these disclosed embodiments. Upon reading the teachings of this disclosure, many modifications and other embodiments of the inventive concept will come to mind of those skilled in the art to which this inventive concept pertains, and which are intended to be and are covered by both this disclosure and the appended claims. It is indeed intended that the scope of the inventive concept should be determined by proper interpretation and construction of the appended claims and their legal equivalents, as understood by those of skill in the art relying upon the disclosure in this specification and the attached drawings.

The invention claimed is:

1. A system for transporting cargo and containers across a body of water, the system comprising:

at least one mothership vessel adapted to carry at least one deployable and retrievable vessel within a hull portion of the at least one mothership vessel;

the mothership vessel adapted to partially submerge a hull portion of the mothership vessel wherein the at least one deployable and retrievable vessels may be deployed from or retrieved by at least one or more of the bow, side, or stern of the mothership vessel, the deployable and retrievable vessels allowed to float when the hull portion of the mothership vessel is in the partially submerged state;

at least one computer processor operable with at least one memory storage medium;

a logistics manager program operationally disposed on the at least one computer processor with the at least one memory storage medium, the logistics manager program adapted to calculate a route and pace of travel to optimize at least the cost of transporting cargo and containers along at least one leg from at least one port facility to the mothership vessel traversed by at least one of the at least one deployable and retrievable vessels, at least one leg wherein the mothership vessel traverses a body of water while carrying at least one of the at least one deployable and retrievable vessels, and at least one leg traversed by at least one of the at least one deployable and retrievable vessels from the mothership vessel toward at least one port facility;

the logistics manager program further adapted to apply at least one or more risk modifiers, the group of risk modifiers including spatial, temporal, material, financial, and environmental values from which to optimize supply chain velocity and at least the cost and speed of transporting cargo and containers along each leg, the modifiers constraining at least one operational domain for the vessels; and the logistics manager program updating the selected route and pace of travel incrementally and in response to voluntary and involuntary changes in at least one or more of the speed and direction of travel of the vessels.

2. The system for transporting cargo and containers across a body of water of claim 1, wherein at least one machine learning program is adapted to optimize at least the cost of transporting the cargo and containers, the machine learning program further adapted to apply the selected modifiers.

3. The system for transporting cargo and containers across a body of water of claim 1, the system further including at least one inland transportation system, the logistics manager program adapted to at least one or more of select a route of at least one inland leg and interface with at least one land route optimization program, the route including at least one or more of road, rail, and river movement.

4. The system for transporting cargo and containers across a body of water of claim 1, further including at least one simulation program interfaced with the logistics manager program.

5. The system for transporting cargo and containers across a body of water of claim 1, wherein the mothership vessel and the at least one deployable and retrievable vessels operate at least partially autonomously, the logistics manager program interfaced with at least one autonomous maritime navigation system, the at least one autonomous maritime navigation system adapted to at least partially autonomously control at least one or more mothership vessels and deployable and retrievable vessels.

6. The system for transporting cargo and containers across a body of water of claim 1, wherein the logistics manager program is operationally coupled to a maritime navigation system, the maritime navigation system adapted to—at least one or more of autonomously, partially autonomously, and manually—assess an area of travel, decide on actions, take actions, and assess results, assessments and decisions performed incrementally and in response to selected events, the navigation system adapted to follow the selected route and pace selected by the logistics manager program and personnel using the logistics manager program.

7. The system for transporting cargo and containers across a body of water of claim 1, wherein the logistics manager program is operationally coupled to a load optimization program adapted to optimize loading and unloading of containers with cargo and without cargo onto and off the deployable and retrievable vessels and loading and unloading deployable and retrievable vessels onto and off the mothership vessel.

8. A method for transporting cargo and containers across a body of water, the method comprising:

providing a logistics manager program operationally disposed on at least one computer processor with at least one memory storage medium wherein the logistics manager program calculates with at least one mathematical model a route and pace of travel to optimize at least the cost of transporting cargo and containers across a body of water;

calculating at least one rendezvous point along at least one leg from at least one port facility to a mothership vessel traversed by at least one of the at least one deployable and retrievable vessels, the mothership vessel adapted to carry the at least one deployable and retrievable vessels on a well-deck within ahull portion of the mothership vessel;

updating the selected route and pace of travel incrementally and in response to voluntary and involuntary changes in at least one or more of the speed and direction of travel of the mothership vessel and the at least one deployable and retrievable vessels;

partially submerging the hull portion of the mothership vessel wherein the plurality of deployable and retrievable vessels are retrieved from at least one or more of the bow, side, or stern of the mothership vessel, the deployable and retrievable vessels floating into the hull portion of the mothership vessel and being secured, the submerging hull portion rising to a transporting position, unsubmerged, wherein the deployable and retrievable vessels are secured to a well deck of the mothership vessel at least partially gravitationally;

calculating at least one leg wherein the mothership vessel traverses a body of water while carrying at least one of the deployable and retrievable vessels to at least one release point;

updating in the logistics manager program the selected route and pace of travel incrementally and in response to voluntary and involuntary changes in at least one or more of the speed and direction of travel of the mothership vessel;

calculating at least one leg from the mothership vessel to at least one release point for at least one port facility for the at least one deployable and retrievable vessels;

partially submerging a hull portion of the mothership vessel wherein the at least one deployable and retrievable vessels are released from at least one or more of the bow, side, and stern of the mothership vessel, the deployable and retrievable vessels floating off and on the mother vessel when the hull portion of the mothership vessel is in the partially submerged state; and selecting a route and pace of travel incrementally and in response to voluntary and involuntary changes in at least one or more of the speed and direction of travel of the mothership vessel and the at least one deployable and retrievable vessels.

9. The method for transporting cargo and containers across a body of water of claim 8, the method further including the step of the logistics manager program applying at least one or more spatial, temporal, material, financial, environmental, and risk modifiers to optimize at least the cost and speed of transporting cargo and containers along each leg of the route, the modifiers constraining at least one operational domain for the vessels.

10. The method for transporting cargo and containers across a body of water of claim 9, the method further including the step of at least one machine learning program optimizing at least the cost and speed of transporting the cargo and containers, the machine learning program further applying the selected modifiers.

11. The method for transporting cargo and containers across a body of water of claim 8, the method further including the step of interfacing with at least one land-based transportation system, the logistics manager program at least one or more of selecting an inland route of at least one inland leg and functionally interfacing with at least one land-based logistics manager program.

12. The method for transporting cargo and containers across a body of water of claim 8, the method further including the step of interfacing with at least one simulation program, the simulation program testing optimization calculations before the mothership vessel and at least one deployable and retrievable vessels execute operations based on those calculations.

13. The method for transporting cargo and containers across a body of water of claim 8, the method further including the step of the logistics manager program interfacing with at least one maritime navigation system, the at least one maritime navigation system at least partially autonomously controlling at least one or more mothership vessels and deployable and retrievable vessels.

14. The method for transporting cargo and containers across a body of water of claim 8, the method further including the step of the logistics manager program operationally coupling to a maritime navigation system, the maritime navigation system at least one or more of autonomously, partially autonomously, and manually assessing an area of travel, deciding on actions, taking actions, and assessing results, assessments and decisions performed incrementally and in response to selected events, the maritime navigation system following the selected route and pace selected by the logistics manager program.

15. The method for transporting cargo and containers across a body of water of claim 8, the method further including the step of the logistics manager program operationally coupling to a load optimization program adapted to optimize loading and unloading of cargo and containers on and off deployable and retrievable vessels and loading and unloading the deployable and retrievable vessels that float on and off the mothership vessel.

* * * * *